XR 3,678,391

X 5355Y

X 5186T

[15] 3,678,391

[45] July 18, 1972

Gough

[54] DIGITAL COMMUNICATION SYSTEM

[72] Inventor: Warren G. Gough, Mountain View, Calif.

[73] Assignee: Sylvania Electric Products, Inc.

[22] Filed: April 6, 1970

[21] Appl. No.: 25,841

[52] U.S. Cl. ....................325/55

[51] Int. Cl. ....................H04b 1/00

[58] Field of Search ..........343/177; 325/55, 64, 51, 53; 340/151, 152; 129/15

[56] References Cited

UNITED STATES PATENTS

| | | | |
|---|---|---|---|
| 3,281,789 | 10/1966 | Willcox et al. | 325/55 |
| 3,510,777 | 5/1970 | Gordon | 325/55 |
| 3,513,399 | 5/1970 | Wycoff | 325/55 |

*Primary Examiner*—Robert L. Griffin
*Assistant Examiner*—Barry Leibowitz
*Attorney*—Norman J. O'Malley, Russell A. Cannon and John F. Lawler

[57] ABSTRACT

The dispatcher's equipment and each mobile unit in a police patrol car has a standard frequency modulated (FM) transceiver for communicating with voice messages. Each mobile unit also has digital circuitry for identifying itself, selecting a prescribed digital code message, synchronizing its operation with that of circuitry in the dispatcher's equipment, converting the digital message to an audio signal for transmission by the FM transceiver, converting an audio signal received by the transceiver to a digital message, and presenting a visual display of digital messages transmitted and received. The dispatcher's equipment includes similar circuitry for selecting, displaying, transmitting and receiving digital messages. In order to synchronize transmitting and receiving circuitry, each receiving circuit resets counters in an associated clock circuit on the leading edge of each digital input having a high logic level. Each mobile unit is manually actuated to transmit a signal acknowledging receipt of a digital message. The dispatcher's equipment automatically transmits a signal acknowledging receipt of a digital message. Routine digital messages from mobile units such as requests to go off duty for lunch or for a status check on an automobile license plate number are processed automatically by a digital computer in the dispatcher's equipment. The assignment/availability status of mobile units and recent digital messages received therefrom and transmitted thereto are visually displayed on the dispatcher's equipment.

28 Claims, 22 Drawing Figures

INVENTOR.
WARREN G. GOUGH

BY Russell A. Cannon

AGENT

INVENTOR
WARREN G. GOUGH

BY Russell A. Cannon

AGENT

INVENTOR
WARREN G. GOUGH

BY Russell A. Cannon

AGENT

INVENTOR.
WARREN G. GOUGH

BY Russell A. Cannon

AGENT

INVENTOR
WARREN G. GOUGH
BY Russell A. Cannon
AGENT

INVENTOR.
WARREN G. GOUGH
BY Russell A. Cannon
AGENT

INVENTOR
WARREN G. GOUGH

BY Russell A. Cannon

AGENT

INVENTOR
WARREN G. GOUGH

BY Russell A. Cannon

AGENT

DIGITAL COMMUNICATION SYSTEM

BACKGROUND OF INVENTION

This invention relates to two-way communication systems and more particularly to such a system wherein the same transceiver is employed to communicate both voice and digital messages.

The police department of a medium size city having a population of 300,000 may have as many as 30 police car patrol units on duty at one time. Since the available frequency spectrum is limited, each police department is assigned one or two frequency channels over which it must conduct all its communications. In order to maintain a current and accurate record of the status and location of all patrol cars, frequent voice communications are made with each car. Each message from a patrol car is acknowledged by the dispatcher and recorded on a status board. Operation in this mode crowds the available communication channels with routine messages and prevents the dispatcher from addressing the more important tasks requiring his attention. One technique of reducing the dispatcher's workload and thus giving him more time to address demanding situations is to employ several dispatchers each servicing only a few patrol cars in a prescribed area. This does not, however, reduce the loading on the associated frequency channels that are available for communications.

An object of this invention is the provision of an improved communication system wherein digital messages are employed to reduce the air time required for routine communications.

SUMMARY OF INVENTION

Briefly, this invention comprises means for converting a series of routine messages to digital codes, a conventional transceiver, and means for transmitting and receiving both voice signals and said digital codes over said transceiver.

DESCRIPTION OF DRAWINGS

FIG. 6 is an enlarged perspective view of the dashboard display unit 67 in FIG. 5;

FIG. 7 is an enlarged plan view of the control panel 70 in FIG. 5;

DESCRIPTION OF PREFERRED EMBODIMENT

In order to reduce the workload on a police department dispatcher and the loading of communication frequency channels, routine communications to and from patrol vehicles are transmitted as digital code messages. The patrol vehicles that may be deployed by a dispatcher include automobiles, motorcycles, helicopters, propeller aircraft and water craft. For simplicity of explanation, only communications with patrol cars are specifically recited hereinafter. Visual representations of transmitted and received digital messages are automatically presented on the dispatcher's equipment and in an associated patrol car. The dispatcher's equipment automatically transmits to a patrol car an acknowledgment that a digital message was received therefrom. An officer in a patrol car manually transmits a digital message notifying the dispatcher of receipt of a digital message. Routine checks of automobile license plate numbers and requests to break for dinner are processed automatically by the dispatcher's equipment. An officer in a patrol car may at any time use his radio for immediate voice consultation with the dispatcher if an emergency situation arises. The dispatcher may be notified periodically of the location of patrol cars by voice transmissions or by an automatic vehicle locator system if the latter is available. Messages that may be considered routine are listed below in Tables 1 and 2. The messages listed in Table 1 can be transmitted digitally by an officer in a patrol car to the dispatcher. The messages listed in Table 2 can be digitally transmitted by the dispatcher to patrol cars.

TABLE 1

Mobile Unit To Dispatcher

| | Radio Code | Description |
|---|---|---|
| 1 | 4 | Further assistance not required |
| 2 | 406 | Officer needs help |
| 3 | 407 | Send patrol wagon |
| 4 | 408 | Send ambulance |
| 5 | 409 | Send tow truck |
| 6 | 10–04 | Message received |
| 7 | 10–06 | Busy, in radio contact (status) |
| 8 | 10–07 | Out of service (status) |
| 9 | 10–07M | Meals (status) |
| 10 | 10–08 | In service (status) |
| 11 | 10–09 | Assigned (status) |
| 12 | 10–11 | Desire voice transmission |
| 13 | 10–25 | Send backup unit |
| 14 | 10–96 | Timed leave (status) |
| — | 10–97 | License plate check |

TABLE 2

Dispatcher To Mobile Unit

| | Radio Code | Description |
|---|---|---|
| 1 | 410 | Assistance responding |
| 2 | 901 | Call your station |
| 3 | 903 | Return to your station |
| 4 | 10–04 | Message received |
| 5 | 10–13 | Advise conditions |
| 6 | 10–20 | Report location |
| 7 | 10–22 | Cancel assignment |
| 8 | 10–23 | Standby |
| 9 | 10–30 | Car wanted |
| 10 | 10–31 | Car has record but is not wanted |
| 11 | 10–32 | Car is clear |
| 12 | 10–99 | License plate check facilities inoperative |

Figure 1:
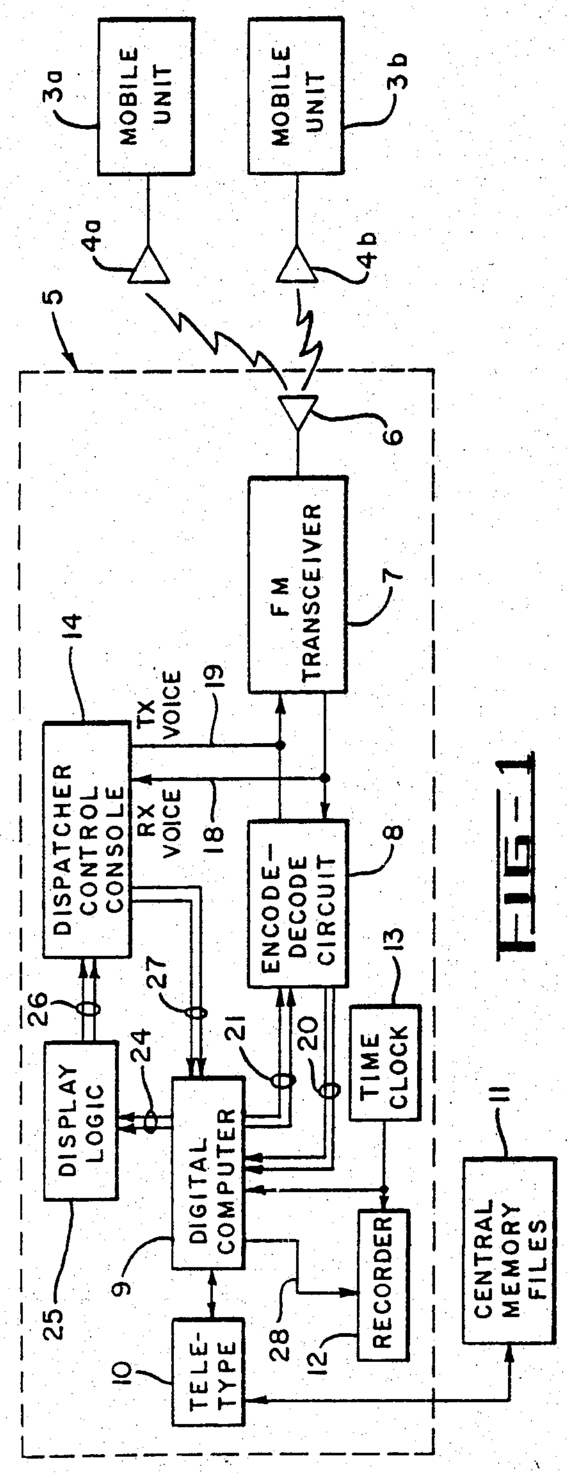
FIG. 1 is a schematic block diagram of a communication system embodying this invention.

A two-way communication system embodying this invention and having particular use by a police department is illustrated in FIG. 1. This system comprises a plurality of mobile units 3 each having an associated transmit-receive antenna 4, and command dispatch equipment 5 which is permanently located at a fixed base station. Each mobile unit is located in a different patrol car. In situations such as a riot, a mobile command center similar to the equipment 5 may be employed to dispatch patrol cars. Each mobile unit and the command equipment includes an FM transceiver for communicating both voice and digital messages over the same frequency channel as illustrated and described more fully hereinafter.

The command equipment 5 comprises transmit-receive antenna 6; FM transceiver 7; encode-decode circuit 8; digital computer 9 having an associated teletype unit 10 and central file-memory equipment 11; recorder 12; time clock 13; and dispatcher control console 14. A typical police communications system may include a single transceiver 7 for transmitting messages from several dispatcher consoles 14. The recorder 12 may, by way of example, be a tape recorder providing a permanent record of all digital messages transmitted and received and the time thereof. The central file 11 may contain information on each driver and auto license plate number in a state. In many instances the memory bank 11 will be maintained by the State Department of Motor Vehicles and located remote from the equipment 5.

Briefly, voice messages from mobile units are received by antenna 6, processed by the transceiver and applied on line 18 to the dispatcher console. Voice messages from the dispatcher are applied on line 19 to the transceiver for transmission to the mobile units. When a digital message from a particular mobile unit is received by antenna 6, it is processed by circuit 8 and is applied on lines 20 to the computer. An output of the computer on lines 21 automatically causes circuit 8 to produce a digital code message for transmission to the particular mobile unit acknowledging receipt of the digital message. The computer also produces an output on lines 24 which is coupled through logic circuit 25 to the dispatcher console to display a visual representation of the received digital code message. If the received message is a request for a license plate check, i.e., a check to see whether an automobile having the associated license plate number is stolen or has warrants against it outstanding, the computer automatically actuates the teletype 10 to interrogate the memory unit 11. The computer automatically produces a digital reply message on lines 21 that is transmitted to the mobile unit. The reply message indicates that the car is "wanted", has a "record", is "clean", or that the teletype link is "inoperative".

A digital code message selected on the dispatcher control console for transmission to a prescribed mobile unit is coupled on lines 27 through the computer and circuit 8 to the transceiver for transmission to each mobile unit. An output of the computer on lines 24 causes a visual representation of the selected message to be displayed on the dispatcher console. Although the code message is received by all of the mobile units, it is only processed and displayed by the addressed mobile unit as described more fully hereinafter. Recorder 12 is responsive to the output of the computer on line 28 for making a permanent record of all digital code messages transmitted and received by the command-dispatch equipment 5.

Figure 3:
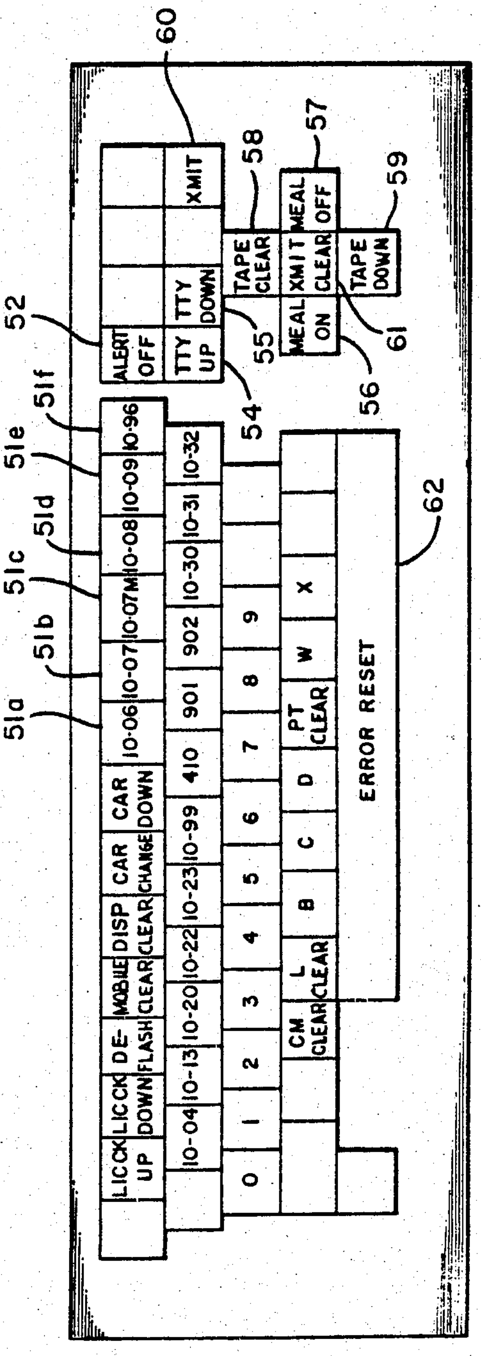
FIG. 3 is a plan view of the dispatcher keyboard 31 in FIG. 2.
Figure 2:
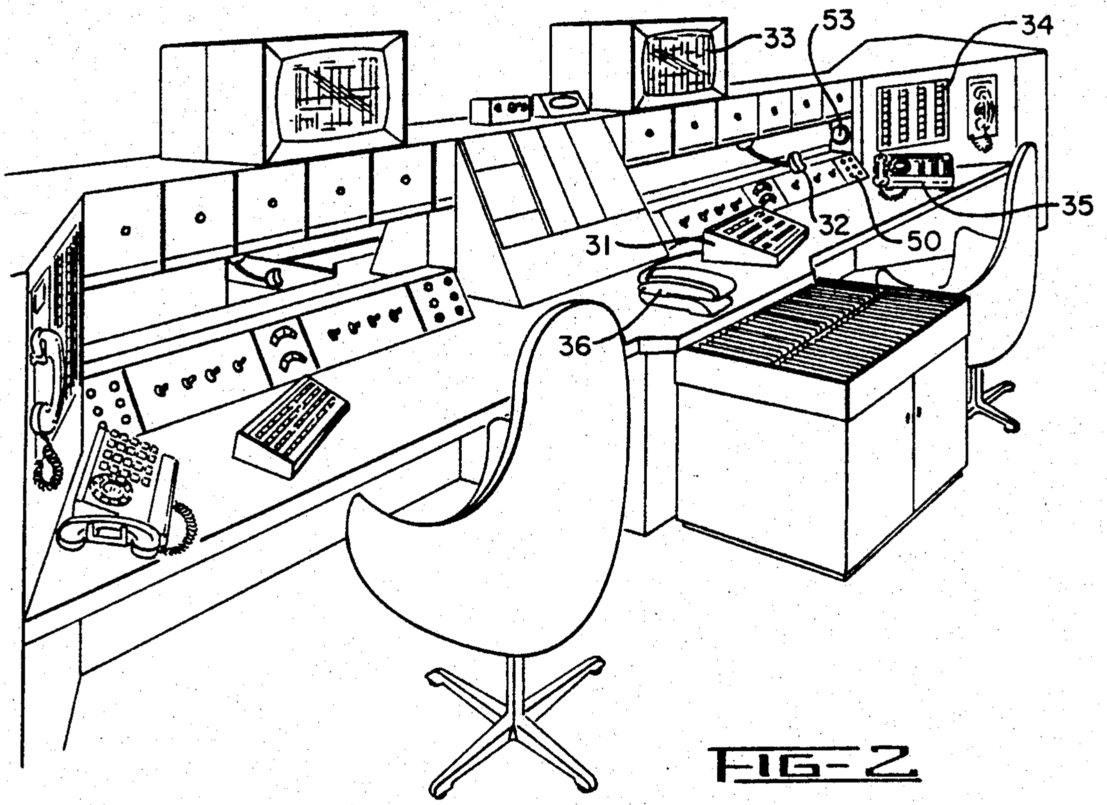
FIG. 2 is a perspective view of the dispatcher control console 14 in FIG. 1.

The dispatcher control console 14 is illustrated in FIG. 2 and comprises keyboard 31, microphone 32, cathode ray tube (CRT) display 33, intercom 34, push button telephone 35 and time-clock 36. A plan view of the push buttons on keyboard 31 is illustrated in FIG. 3. This unit is employed to select a digital code message, to address it to a particular mobile unit and to transmit the message.

Figure 4:
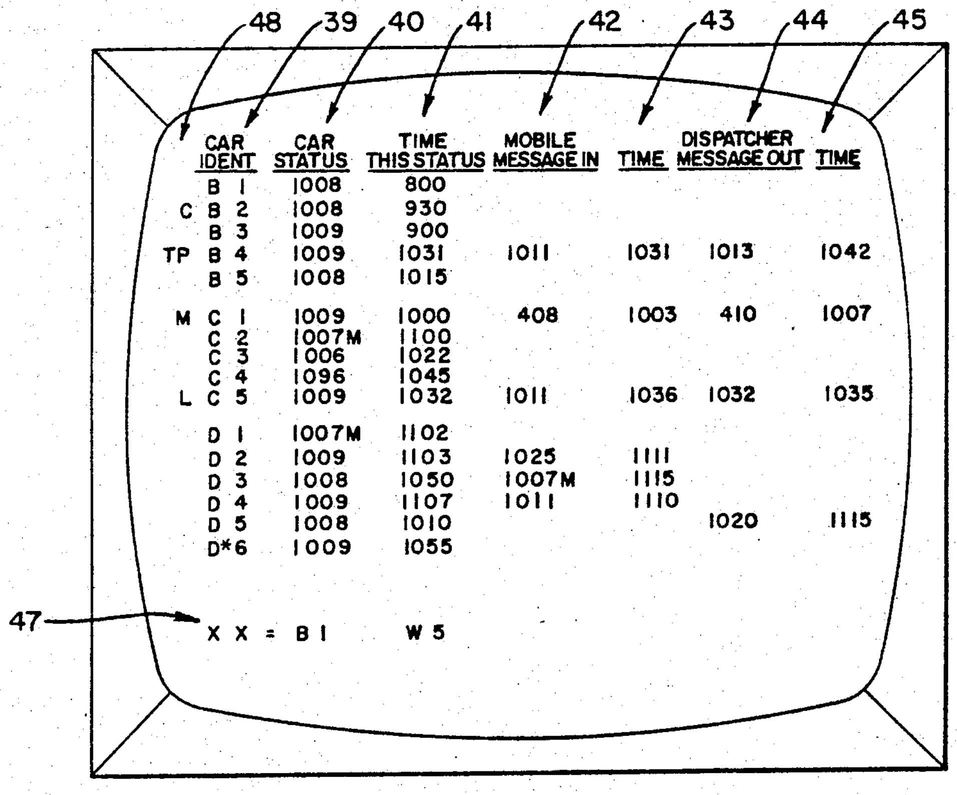
FIG. 4 is a visual representation of the information presented on the cathode ray tube display unit 33 in FIG. 2.

A visual representation such as that illustrated in FIG. 4 is presented on CRT 33 for all digital messages transmitted and received by the equipment 5. The identity (ID) of each patrol car is displayed in column 39 where letters B, C and D in that column designate districts into which the city is divided and to which patrol cars are assigned. The identity of the mobile unit in a particular patrol car is contained in the computer. The information in each row is related to the car designated in column 39 of that row. Digital code messages designating the current status of a patrol car and the time that status message was received are illustrated in columns 40 and 41, respectively. The code names automatically displayed in column 40 are those listed in Table 1 with the word status in parenthesis following the description thereof. The most recent digital message (other than certain status messages) received from a mobile unit and the time of receipt thereof are displayed in columns 42 and 43, respectively. Digital code messages transmitted by the dispatch equipment and the time of transmission thereof are displayed in columns 44 and 45, respectively. As a dispatcher composes a particular digital message by depressing keys on keyboard 31, the information is applied to the computer which causes the message to be displayed in the scratch area 47 at the bottom of CRT 33.

As described more fully hereinafter, the capital letters C, P, T, M and L in column 48 apprise the dispatcher as to conditions related to associated patrol cars. More particularly, C (change) indicates that a new status message is displayed for the patrol car; P (phone) indicates that the patrol car desires voice contact with the dispatcher; T (time) indicates that a digital message was transmitted to the patrol car by the dispatcher equipment more than 5 minutes ago and that receipt thereof has not yet been acknowledged by the patrol car; M (multiple) indicates that the patrol car is addressing the dispatcher with a second digital message prior to receiving an answer to a first digital message; and L (license check) indicates that the patrol car is making a status check on an automobile license plate number.

Referring now to the plan view of the dispatcher's keyboard 31 in FIG. 3, the B, C and D keys in row 4 (reading top to bottom as viewed in FIG. 3) and the keys in row 3 are used to address a particular patrol car — mobile unit. The W and X keys in row 4 are used in conjunction with the B, C and D keys in that row and the keys in row 3 to enter the identity of a patrol car — mobile unit into the computer and onto CRT 33. The C-M, L and P-T CLEAR keys in row 4 are used to clear these capital letters appearing in column 48 of CRT 33. The keys in row 2 are used to select a digital code message for transmission to a mobile unit. The LIC. CK (license check) UP and DOWN keys in row 1 are used to program the computer as to whether the necessary equipment and facilities for performing this function are operative or inoperative, respectively. The DEFLASH key is used to deenergize a flashing red light 50 (see FIG. 2) on the display console indicating that an emergency situation has occurred. The MOBILE and DISP (dispatcher) CLEAR keys are used to clear information in a designated row of columns 42 and 44, respectively. The CAR CHANGE key is used to assign a particular mobile unit to a different patrol car. The CAR DOWN key is used to remove a specified patrol car — mobile unit from the computer memory and CRT 33. The remaining keys *51a* — *51f* in row 1 are used to present car status information in column 40 for patrol cars not having a mobile unit.

The ALERT OFF key 52 at the right in FIG. 3. is used to deenergize an alarm bell 53 on the dispatcher console which rings to indicate the occurrence of an emergency situation. The TTY (teletype) UP and DOWN keys 54 and 55, respectively, are used to program the computer as to whether or not the teletype unit 10 is operative. Similarly, the MEAL ON and OFF keys 56 and 57, respectively, program the computer as to whether or not it is to automatically process requests from mobile units to break for meals. The TAPE CLEAR and DOWN lights 58 and 59 indicate whether or not the recorder unit 12 is operative. The XMIT (transmit) key 60 is pressed to transmit a digital message composed on keyboard 31. The XMIT CLEAR key 61 is pressed to clear the keyboard after a system malfunction. Similarly, ERROR RESET key 62 is used to clear the identity of a mobile unit and message selected on the keyboard but not yet transmitted.

The dispatcher may at any time communicate by voice with any and all patrol cars by using the microphone 32 in FIG. 2. The intercom 34 enables the dispatcher to communicate with other people at the command facility housing the equipment 5. Push button telephone 35 enables the dispatcher to automatically contact various authorities in the event that a message requiring their attention is received. Time clock 36 is used by the dispatcher to record the time and date on written messages.

Computer 9 in FIG. 1 is periodically programmed with the identity of the patrol cars on duty (e.g., at the end of each shift) and the associated mobile units. Some of the other programs in the computer memory are for: automatically transmitting to a particular mobile unit — patrol car a code 10-04 (message received) message when a digital message is received from that car; entering in columns 40 and 42 of FIG. 4 the code names of certain and other, respectively, digital messages from mobile units; selectively entering into and erasing from column 48 the code letters C, P, T, M, and L; selectively erasing information displayed in columns 42–45 on receipt of a code 10-04 (message received) message from an associated mobile unit; automatically processing a code 10-07M(request to break for meals) message from a mobile unit; and automatically processing a code 10-97 (automobile license plate number check) message from a mobile unit. The programs in the computer do not per se constitute part of applicant's invention. These programs may, by way of example, be written in a language compatible with computer 9 in accordance with the teachings in Computer Software by I. Flores, Prentice Hall, or any users' programmers manual that is supplied with the chosen computer (e.g., Hewlett-Packard 2115-A).

The encode-decode unit 8 includes circuitry similar to that comprising a mobile unit 3 and is described more fully hereinafter.

Figure 5:
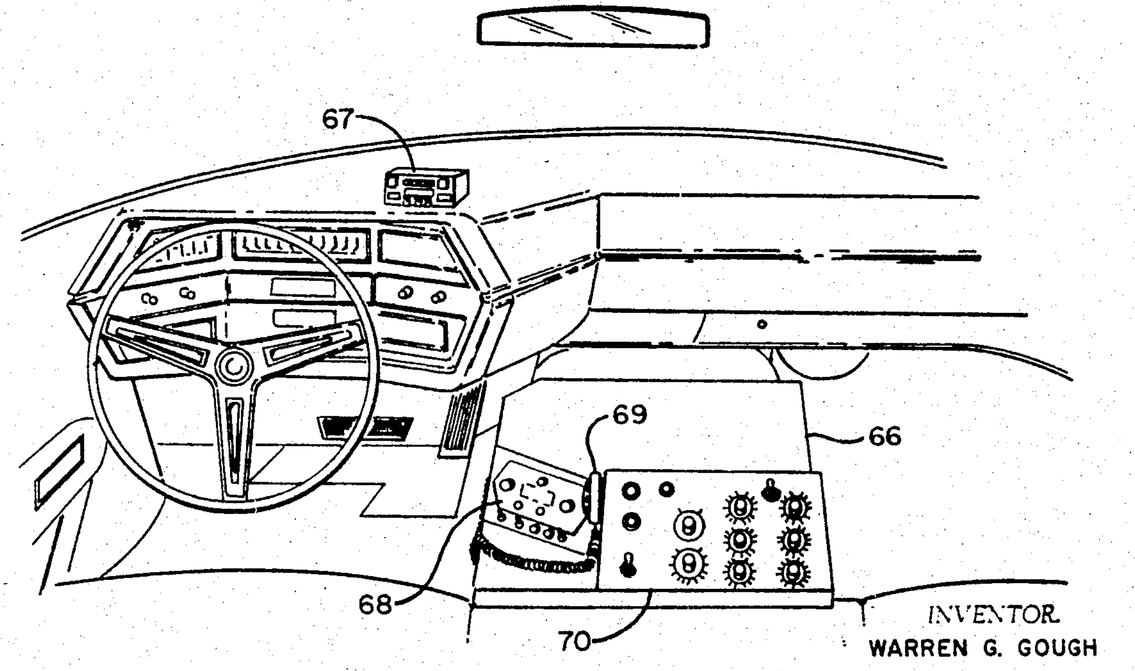
FIG. 5 is a perspective view of a portion of the interior of a police patrol car illustrating the location of the parts 66 and 67 of a mobile unit 3 therein.

Referring now to FIG. 5, each mobile unit 3 comprises an electronic control package 66 next to the driver on the floor of the patrol car and a remote display unit 67 on the dashboard in front of the driver. The panel 68 on package 66 includes controls for operating the radio, siren, emergency stop lights, blinking warning lights, etc. Microphone 69 is used to communicate by voice with other mobile units and the dispatcher. The panel 70 on package 66 includes controls for selecting and transmitting a digital code message to the dispatcher in accordance with this invention.

An enlarged perspective view of the dashboard display unit 67 is illustrated in FIG. 6 and comprises screens 71 and 72 for presenting a visual representation of the code names of digital messages that are transmitted and received, respectively; alphanumeric readout tubes 73–78 for presenting a visual representation of the license plate number selected for transmission; and indicators 81–83 to make an officer in a patrol car aware of a particular occurrence. The displays on screens 71 and 72 are obtained by selectively illuminating a lamp of a lamp matrix, each lamp being located behind an opaque mask supporting a different transparent symbol representing the name of a digital code message. Each of the tubes 73–78 preferably can display an alphabetic or a numeric character since license plate numbers may be made up of any combination of alphabetic and numeric characters. Indicator 81 comprises a bulb that is energized to give off white light to notify an officer in the car that a digital message has been received and that action is required by him. The indicator lamp remains lighted until the officer transmits a code 10-04 (message received) message to the dispatcher. Indicator 82 comprises a lamp that is energized to give off red light when a code 406 (officer needs help) message is selected for transmission by an officer. This reduces the number of false transmissions of this emergency message. Indicator 83 comprises a lamp that is energized to give off blue light when particular reference characters of the license plate number indicated by tubes 73–78 are to be interchanged during transmission of a digital message.

An enlarged front view of control panel 70 is illustrated in FIG. 7 and comprises rotary switch 84 for selecting whether a license check or a code message is to be transmitted; rotary switch 85 for selecting a code message for transmission; and, rotary switches 86–91 for selecting the alphabetic and numeric characters in a license plate number. Each of the switches 86–91 preferably can select both alphabetic and numeric characters. When switch 84 is in the CODE position, a visual representation of the radio code selected by switch 85 is presented on screen 71 as shown in FIG. 6. When switch 84 is in the LICENSE position, the characters selected by switches 86–91 are displayed on tubes 73–78, respectively, as illustrated in FIG. 6.

Some states such as California have two types of license plate numbers for passenger cars. One type comprises three alphabetic characters followed by three numeric characters (e.g., AAA 333). The other comprises three numeric characters followed by three alphabetic characters (e.g., 333 AAA). In an economical system for use in such states the switches 86–91 and tubes 73–78 would be enabled to select and display, respectively, either an alphabetic or a numeric character, but not both. This would simplify the circuitry associated with these components. By way of example, the switches 86–88 and 89–91 may select alphabetic and numeric characters, respectively. The corresponding illuminating elements in tubes 73–75 and 76–78 would always display only these alphabetic and numeric characters, respectively. Toggle switch 94 controls the order in which the characters selected by switches 86–91 are transmitted by the mobile unit. When switch 94 is in the LICENSE position the alphanumeric characters are transmitted in the order in which they are selected and displayed by switches 86–91 and 73–78, respectively (e.g., AAA 333). When switch 94 is in the NEW position, however, the indicator 83 on the dashboard display unit 67 is illuminated to give off a blue light and the numeric characters selected by switches 89–91 are transmitted before the alphabetic characters selected by switches 86–88 even though the order in which they are displayed by tubes 73 – 78 is unchanged.

Digital messages selected by switches on panel 70 may each comprise 29 binary bits of information. The three types of digital messages selected by a mobile unit are represented by the binary words:

000 . . . . . . 0100 00, (1)

0011 0011 0011 00001 00001 00001 01, and (2)

00001 00001 00001 0011 0011 0011 11. (3)

The first two most significant bits (reading right to left) in these words are control bits. The first bit is a 0 and a 1 when switch 84 is in the CODE and LICENSE positions, respectively. The second bit is a 0 and a 1 when switch 94 is in the LICENSE and NEW positions, respectively. Thus, word (1) defines a code message, word (2) defines a license plate number comprising three alphabetic characters followed by three numeric characters, and word (3) defines a license plate number comprising three numeric characters followed by three alphabetic characters. The remaining 27 bits in each word specifically defines the selected message. The code names listed in Table 1 are represented by a 1 in the position to the left of the two control bits that is specified by the numeral in the left column of Table 1. By way of example, the word (1) specifies the radio code 407. Alternatively, the code names may be represented by binary numbers. The alphabetic and numeric characters are each represented by an associated binary number. By way of example, the fifth alphabetic character E is represented by the binary number 00101. The groups of five and four digits in words (2) and (3) are each used to define a different alphabetic or numeric character, respectively. Thus, word (2) specifies the license plate number AAA 333. Conversely, word (3) specifies the license plate number 333 AAA.

Toggle switch 95 is employed to select the code 406 (officer needs help) emergency message for transmission. When switch 95 is in the ON position, indicator 82 on the remote display 67 is illuminated to give off red light. Springloaded push button switches 96, 97 and 98 are employed to transmit a selected digital code message, acknowledge receipt of a particular digital code message, and reset the mobile unit, respectively. The code names displayed on screens 71 and 72 are removed when switches 96 and 98, respectively, are pressed.

Figure 8:
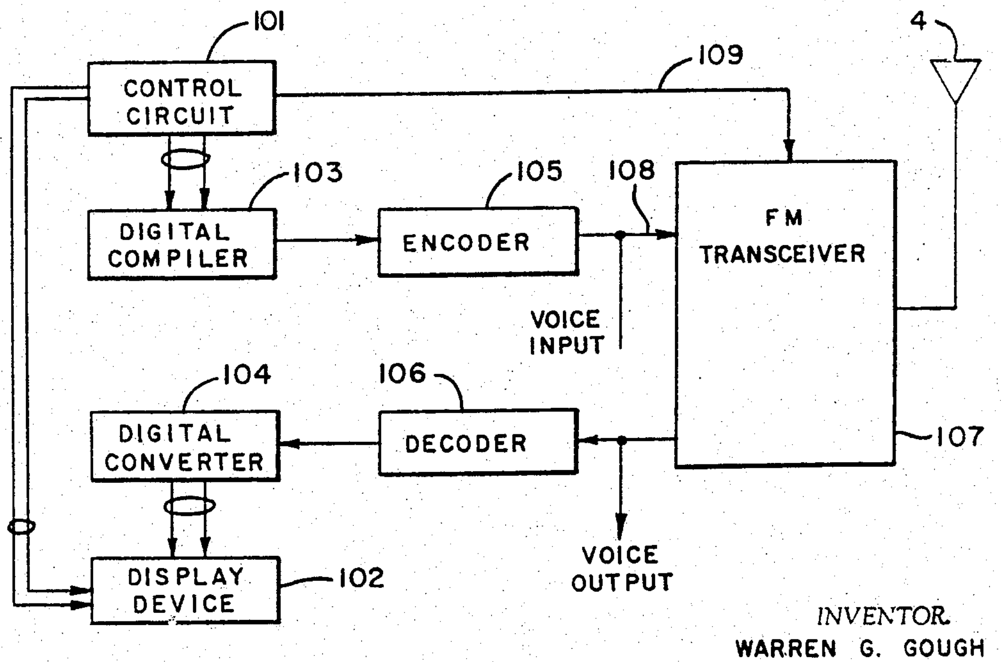
FIG. 8 is a simplified schematic block diagram of a mobile unit 3.

Referring now to FIG. 8, a mobile unit generally comprises control circuit 101, display device 102, compiler 103, converter 104, encoder 105, decoder 106, and FM transceiver 107. A visual representation of a digital message selected for transmission by adjusting control circuit 101 is displayed by device 102. Compiler 103 is a parallel-to-serial device for assembling a plurality of input signals from the control circuit into a serial-digital output signal that is chopped by the encoder for producing an audio signal that is applied on line 108 to the transceiver. Voice signals are also applied on line 108 to the transceiver. Operation of the power tube in the transceiver for transmitting the analog output signal on line 108 is selectively controlled by a signal on line 109.

Analog signals corresponding to digital messages from the dispatcher are received by antenna 4 and coupled through the transceiver to circuit 106. The decoder converts the analog input signal to a serial-digital output signal. Converter 104 is a serial-to-parallel device that converts the output of the decoder to signals having an appropriate digital format to cause the display device to present a visual representation of the received digital message.

Figure 9:
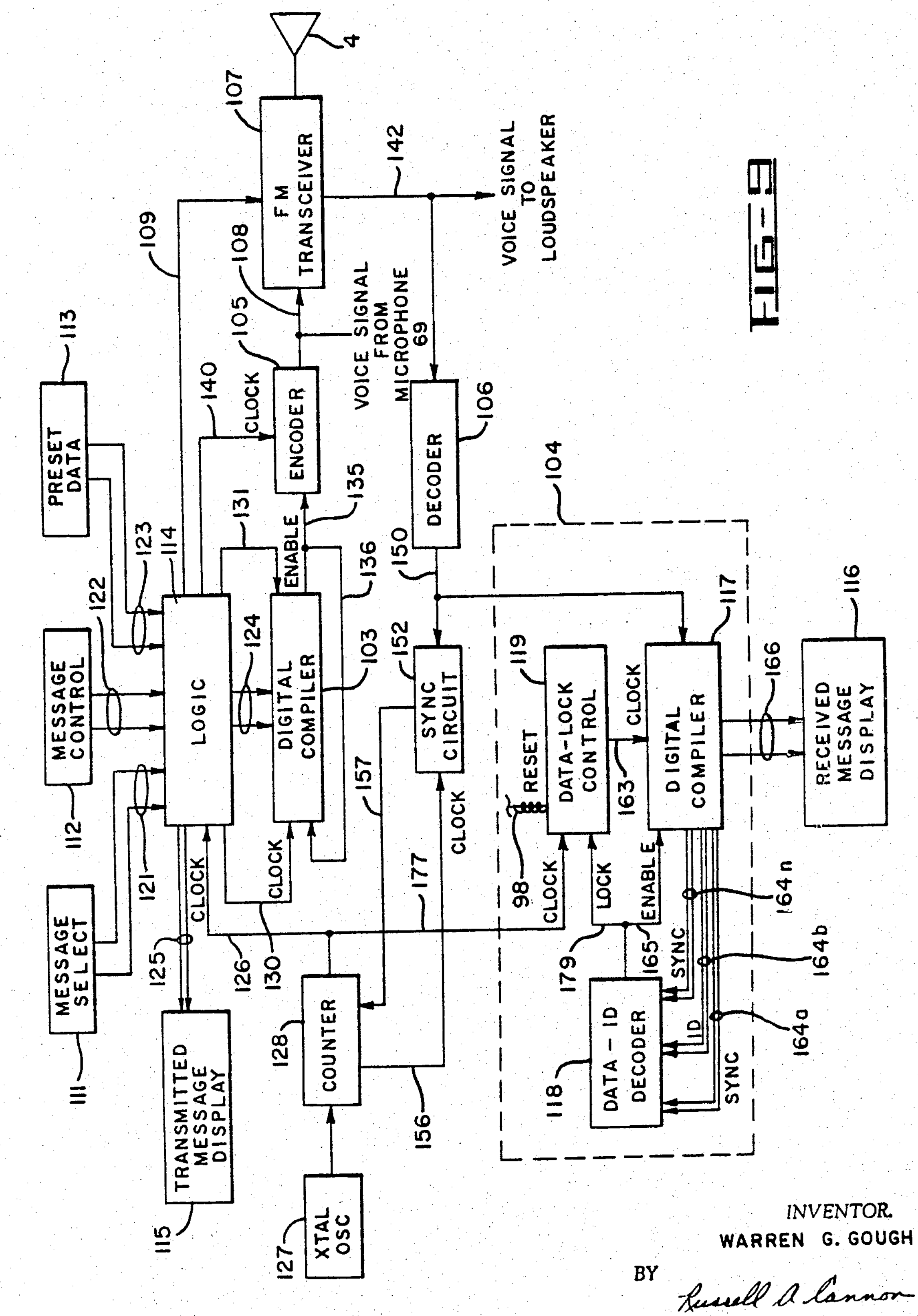
FIG. 9 is a detailed schematic block diagram of the mobile unit 3 in FIG. 8.

A more detailed representation of the mobile unit is illustrated in FIG. 9 wherein the control circuit 101 comprises message select circuitry 111, message control circuitry 112, preset data circuitry 113 and logic circuit 114; display device 102 comprises transmitted and received message displays 115 and 116, respectively; and, converter 104 comprises compiler 117, data-ID decoder 118 and data-lock control circuit 119. The message select circuitry 111 includes the switches 85–91, 94 and 95 on control panel 70 (see FIG. 7). Similarly, the message control circuitry 112 includes the switches 84, 96 and 97 on panel 70. The preset data circuitry is preferably wired to provide a plurality of binary output signals representing the ID code for the particular mobile unit and a synchronization code. By way of example, the ID code identifying the mobile units B1, . . . , B5, C1, . . . , may be the binary numbers 00001, . . . , 00101, 00110, . . . , respectively. The synchronization code may, for example, be the binary number 011010.

Figure 10:
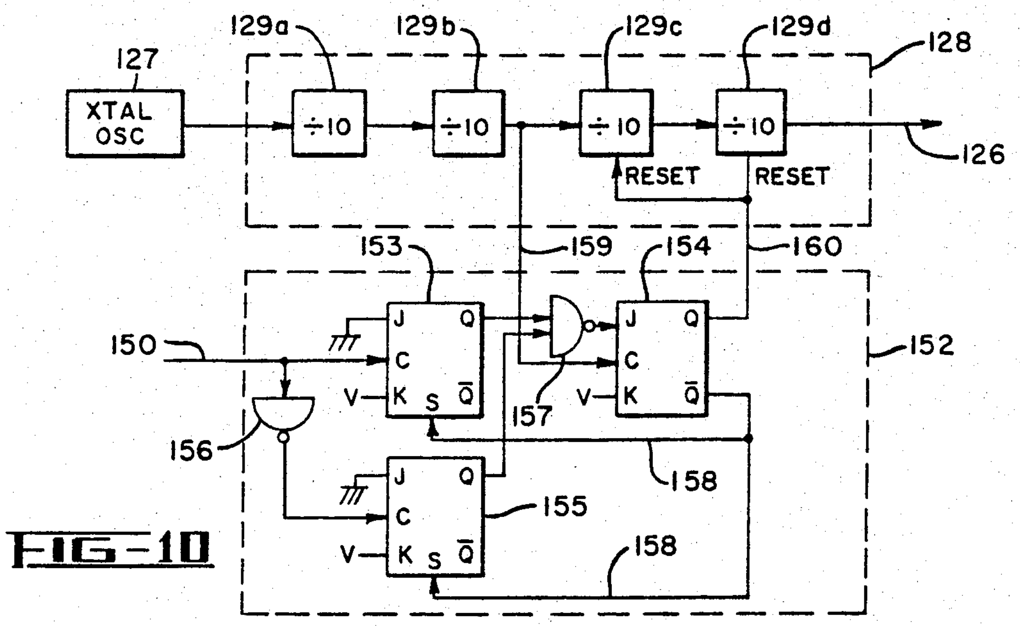
FIG. 10 is a schematic circuit diagram of the synchronization (sync) circuit 152 and clock circuitry in FIG. 9.

Logic circuit 114 is responsive to the plurality of signals on lines 121, 122 and 123 for producing on lines 124 binary signals comprising a digital word uniquely defining the selected digital code message and other information from circuit 113. The logic circuit also produces outputs on lines 125 which bias display 115 (i.e., screen 71 in FIG. 6) to present a visual representation of the digital message selected for transmission. The design of logic circuits such as circuit 114 is generally described in texts such as Logic Design of Digital Computers by M. Phister, Jr., John Wiley & Sons, Inc. Clock pulses for controlling the operation of logic circuit 114 are produced on line 126 by a crystal controlled oscillator 127 which drives counter 128. As illustrated in FIG. 10, the counter comprises a series of divide-by-10 circuits 129. The clock rate of pulses produced by oscillator 127 is, for example, 2.5 MHz. Thus, the clock pulses on line 126 have a low frequency clock rate of only 250 Hz. These low frequency clock pulses are selectively coupled through logic circuit 114 and are applied on line 130 to compiler 103.

Figure 11:
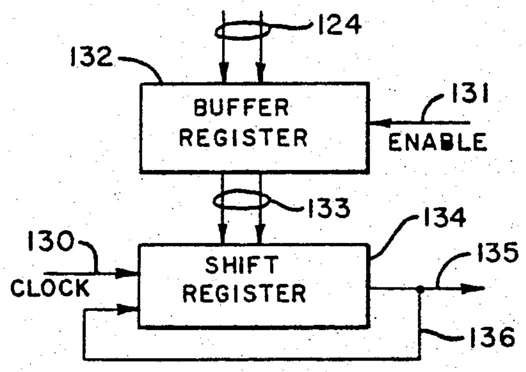
FIG. 11 is a block diagram of the digital compiler 103 in FIG. 9.
Figure 12:
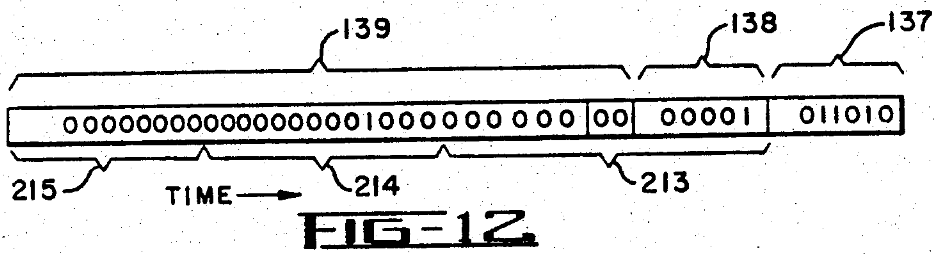
FIG. 12 is a graphic representation of a digital code message transmitted by a mobile unit 3.

Referring now to FIG. 11, compiler 103 comprises buffer register 132 and shift register 134. The buffer register is enabled by a control pulse on line 131 for loading the contents thereof on lines 133 into the shift register. Shift register 134 is responsive to the clock pulses on line 130 for serially advancing the contents thereof onto line 135 and to the encoder. The contents of register 134 are also recirculated on line 136. By way of example, 40 bits of digital information may be initially loaded into shift register 134, see FIG. 12. This information comprises a six-bit sync word 137, a five-bit ID word 138 (identifying the mobile unit), and a 29-bit message word 139. The digital words 137–139 are shown in FIG. 12 in the order in which they are applied to encoder 105.

Figure 13:
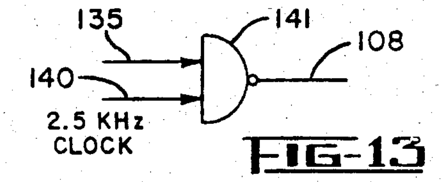
FIG. 13 is a circuit diagram of the encoder 105 in FIG. 9.

Logic circuit 114 is also selectively responsive to the low frequency clock pulses on line 126 for producing on line 140 high frequency clock pulses. By way of example, the repetition rate of the clock pulses on line 140 may be 10 times the repetition rate of pulses on line 126. Thus, the clock rates on line 126 and 140 may be 250 Hz and 2.5 KHz, respectively. Encoder 105 is responsive to the high frequency clock pulses on line 140 for chopping the output of compiler 103 when it is high for producing an audio signal on line 108. The output of the encoder is a constant reference voltage having a frequency of 0 Hz when the input signal on line 135 is low. As illustrated in FIG. 13, the encoder comprises a NAND gate 141. As described more fully hereinafter, there is a similar encoder 105′ responsive to high frequency clock pulses on a line 140′ in circuit 8 of the equipment 5. Voice signals from an officer in a patrol car and picked up by microphone 69 (see FIG. 5) are also applied on line 108 to the transceiver.

Decoder 106 is responsive to the output of the transceiver on line 142 for converting audio signals corresponding to a digital code message from dispatcher equipment into a digital message word. By way of example, the output of the decoder may comprise the 32-bit word illustrated in FIG. 14. This word comprises a first six-bit sync word 143, a five-bit ID word 144, a 15-bit message word 145, and a second six-bit sync word 146. The two sync words 143 and 146 are identical.

Figure 15:
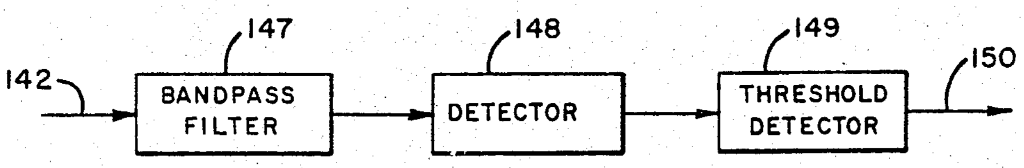
FIG. 15 is a block diagram of the decoder 106 in FIG. 9.

The decoder comprises bandpass filter 147, energy detector 148 and threshold detector 149, see FIG. 15. Filter 147 has a narrow passband response which is centered at the 2.5 KHz high frequency clock rate of pulses on line 140. The filter therefore blocks audio signals having frequencies other than the frequency of audio signals produced by an encoder 105′. Detector 148 produces a DC output voltage having a magnitude proportional to the energy in audio signals passed by the filter. Detector 149 may be a Schmitt trigger circuit which produces a binary output signal that is high and low when the output of detector 148 is greater than and less than, respectively, the threshold level of detector 149.

Synchronization circuit 152 comprises J-K flip-flop circuits 153–155 and NAND gates 156 and 157, see FIG. 10. The output of the decoder circuit 106 is applied on line 150 to the clock input of flip-flop 153 and to the input of gate 156. The J and K inputs of flip-flops 153 and 155 are connected to reference potentials as is the K input of circuit 154. The Q outputs of flip-flops 153 and 154 are applied to NAND gate 157. The set inputs on these flip-flops are both connected on lines 158 to the $\overline{Q}$ output of flip-flop 154. The output of gate 157 is applied to the J input of flip-flop 154. Clock pulses from counter 128 are applied on line 159 to the clock input of flip-flop 154. The Q output of this circuit is applied on line 160 to the reset terminals of divider circuits 129*c* and 129*d*.

Briefly, since the mobile unit and dispatch equipment are asynchronous, the synchronization (sync) circuit 152 is responsive to the output of decoder 106 for synchronizing the operation of the mobile unit with received digital messages. This is accomplished by resetting dividers 129*c* and 129*d* of the counter on both transitions of the binary word on line 150.

Consider that the output of the decoder on line 150 is low for an extended period of time, that the Q outputs of flip-flops 153 and 155 are both high, and that the Q output of flip-flop 154 is low. When the input signal on line 150 goes high, the operation of flip-flop 153 is unaffected. This signal on line 150, however, causes the output of gate 156 to go low. This negative going clock input causes flip-flop 155 to make the Q output thereof low. This signal causes the output of gate 157 to go high. The negative transition of the next clock pulse on line 159 causes the Q and $\overline{Q}$ outputs of flip-flop 154 to be high and low, respectively. This low logic level on lines 158 sets flip-flops 153 and 155 to cause the Q outputs thereof to both be high so that the output of gate 157 is again low. The clock pulses on line 159 have a much higher repetition rate than the data rate of pulses on line 150. By way of example, the repetition rate of pulses on line 159 may be 100 times that of the pulses on line 150. The next clock pulse on line 159 causes the Q output of flip-flop 154 to again assume the low state on the J input thereof and thus to terminate reset of divider circuits 129*c* and 129*d*. The Q of flip-flop 154 which is now high has no effect on the operation of flip-flops 153 and 155. The Q output of flip-flop 154 remains low until occurrence of the lagging transition of the input pulse on line 150.

When the signal on line 150 goes low, the output of gate 156 goes high and has no effect on the operation of flip-flop 155. This low input signal on line 150, however, clocks flip-flop 153 to cause the Q output thereof to go low to make the output of gate 157 high. The lagging edge of the next clock pulse on line 159 therefore causes the Q output of flip-flop 154 to go high to again reset counters 129c and 129d. The low $\bar{Q}$ output of flip-flop 154 again sets flip-flops 153 and 155 to cause the Q outputs thereof to be high. The trailing edge of the next clock pulse on line 159 clocks flip-flop 154 to cause the Q output thereof to again be low to terminate reset of circuits 129c and 129d. This operation is repeated on the leading and lagging edges or transitions of each pulse on line 150. The clock pulses produced by counter 128 on lines 126 and 177 (see FIG. 9) are now synchronized with the leading and lagging edges of the digital word on line 150 corresponding to digital code messages received by the transceiver from another unit.

Figure 16:
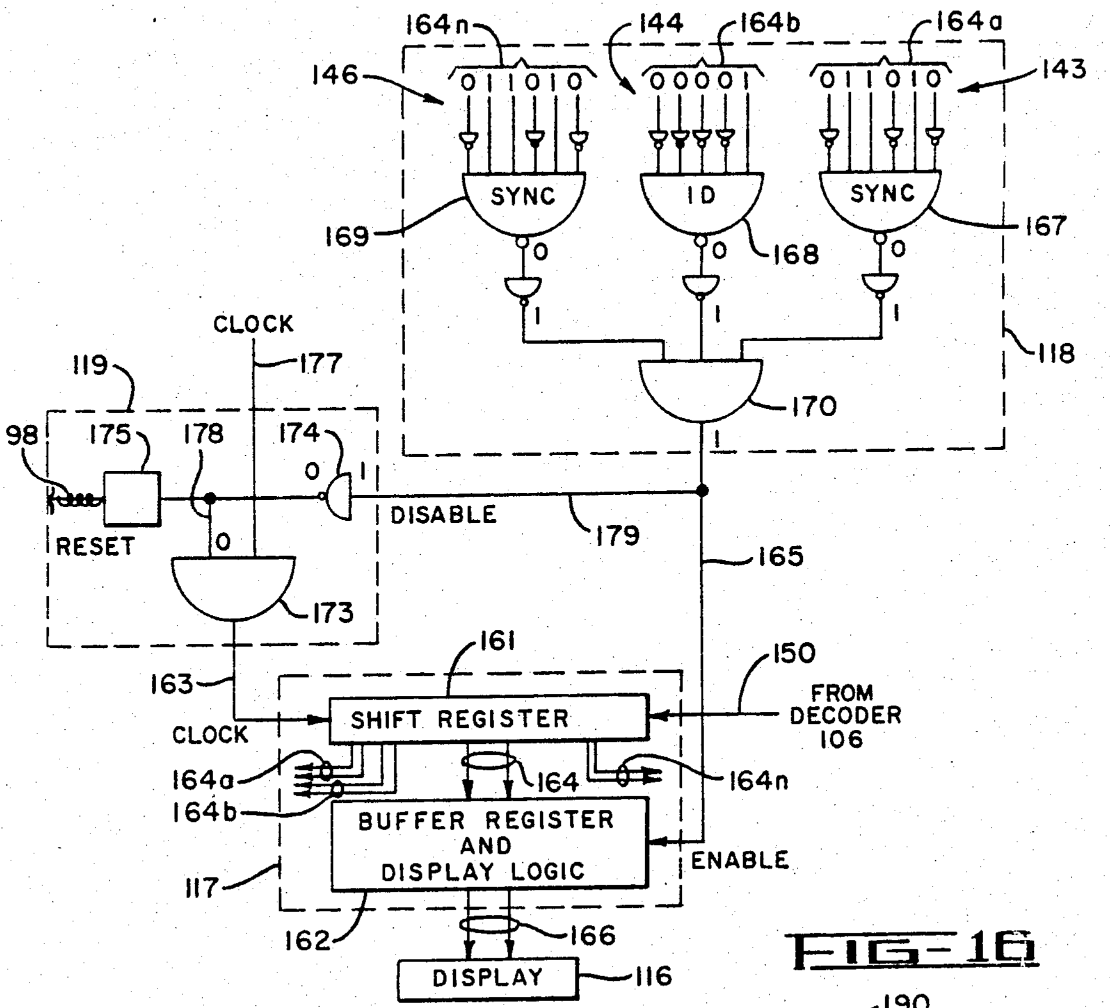
FIG. 16 is a schematic circuit diagram of digital compiler 117, data-ID decoder circuit 118, and data-lock control circuit 119 in FIG. 9.

As illustrated in FIG. 16, compiler 117 comprises a shift register 161 and buffer register and display logic 162. Register 161 is responsive to clock pulses on line 163 for serially entering the binary signals on line 150 into the stages thereof. The contents of the stages of register 161 are entered on lines 164 into associated stages of the buffer register. The signals on line 164*a*, 164*b* and 164*n* correspond to the digital words 143, 144 and 146, respectively, see FIG. 14. Register and logic 162 is enabled by a control pulse on line 165 for applying the contents thereof on lines 166 for causing display 116 to present a visual representation on screen 72 (see FIG. 6) of the received digital message.

Figure 14:
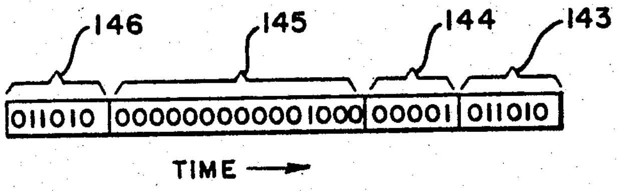
FIG. 14 is a graphic representation of a digital code message received by a mobile unit 3 from dispatcher equipment.

Data-ID decoder circuit 118 (see FIG. 16) comprises NAND gates 167, 168 and 169 which are responsive to the contents of the shift register 161 on lines 164*a*, 164*b* and 164*n*, respectively. The outputs of gates 167–169 are inverted and applied to AND gate 170 to produce the control pulse on line 165. Logic elements are wired into input lines to gates 167 and 169 to cause the outputs thereof to be low only when the digital sync code words 143 and 146 in FIG. 14 are applied thereto. Similarly, logic elements are wired into input lines to gate 168 so that the output thereof is low only when a particular digital word 144 which uniquely identifies only that mobile unit is applied thereto. Thus, gate 170 produces an output pulse only when the sync words 143 and 146 and the correct ID word 144 are simultaneously applied to gates 167, 168 and 169, respectively. This occurs at the exact time that the digital words 143–146 are all loaded in register 161. This is important since all digital messages are received by and passed through the shift register 161 of each mobile unit. It is desirable that only the addressed mobile unit, however, process and display the message.

Data-lock control circuit 119 (see FIG. 16) comprises AND gate 173, NAND gate 174 and a bias voltage source 175 whose operation is controlled by springloaded push button switch 98. Clock pulses on line 177 are applied to the first input to gate 173. The output of gate 170 is inverted by NAND gate 174 and applied to the second input 178 to gate 173. The output of source 175 is also connected to the second input to gate 173.

During operation when a digital message is not received the output of gate 170 is low. This causes the output of gate 174 to be high to enable gate 173. Thus, clock pulses on line 177 are passed by gate 173 to shift register 161. When a digital message that is addressed to this mobile unit is centered in register 161, the gates 167–169 open. This operation causes gates 170 and 173 to close to prevent clock pulses being applied to register 161. The shift register 161 therefore remains full and cannot be loaded with a subsequent digital message until the mobile unit is manually reset. Register and logic 162 is also responsive to this operation of gate 170 for outputting signals to cause display 116 to present a visual representation of the code message in register 161. The mobile unit is reset by actuating switch 98 to momentarily make the input on line 178 high to enable gate 173. The next clock pulse on line 177 is then passed by gate 173 to advance the contents in register 161. Since the words 143, 144 and 146 are no longer simultaneously applied to circuit 118, gate 170 opens to enable gate 173. Subsequent clock pulses on line 177 are therefore passed by gate 173 to again advance binary input signals on line 150 through register 161.

Figure 17:
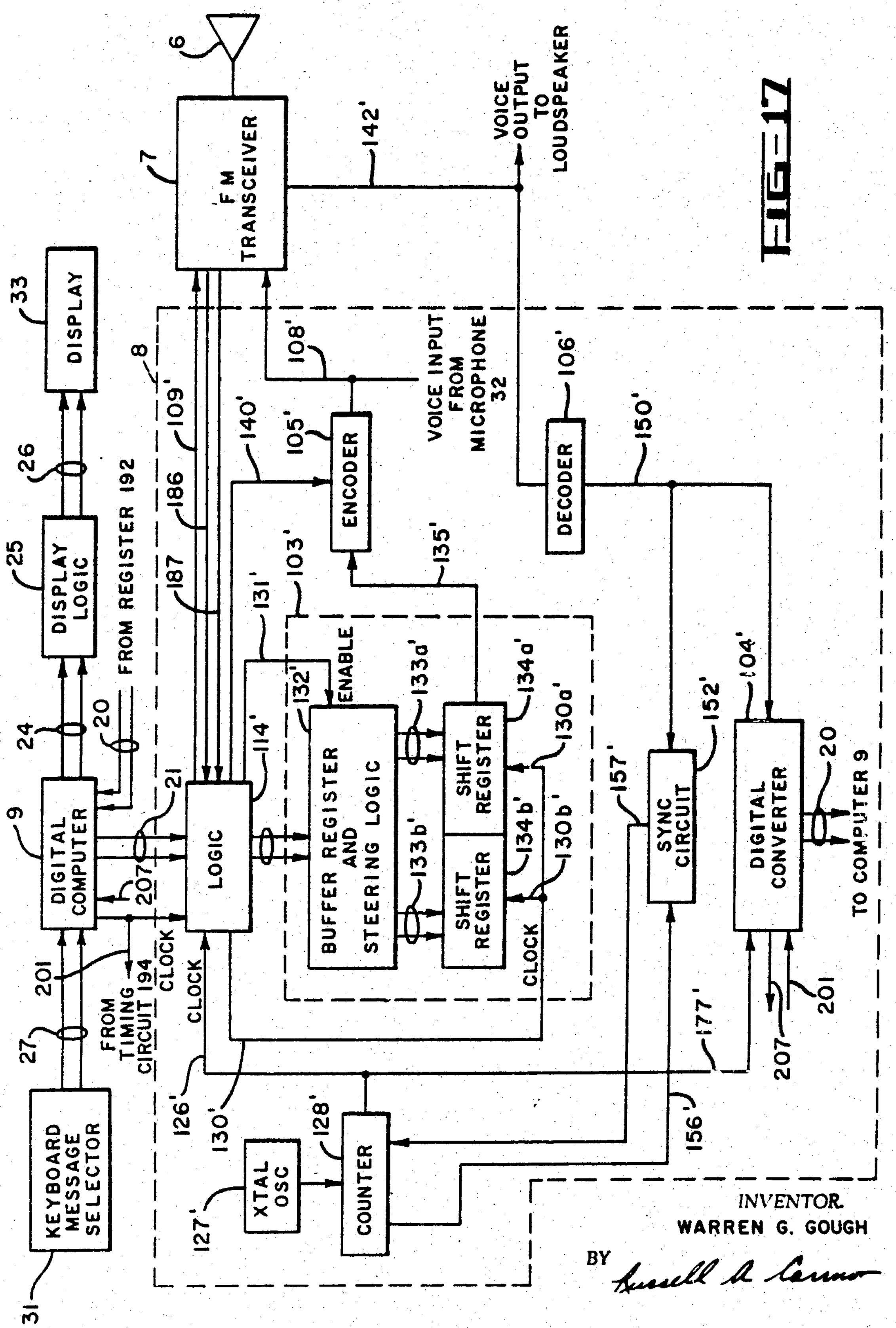
FIG. 17 is a block diagram of the encode-decode circuit 8 in FIG. 1.

The encode-decode circuit 8 in the dispatch equipment 5 includes circuitry similar to that comprising a mobile unit 3. In the block diagram of circuit 8 in FIG. 17, components similar to those in a mobile unit are identified by primed reference characters. Referring now to FIG. 17, circuit 8 comprises digital compiler 103', digital converter 104', encoder 105', decoder 106', and logic circuit 114'.

The ID of an addressed mobile unit and a digital code message for transmission are both selected on keyboard 31 and applied on lines 27 to the computer. This information, together with the sync code, is applied on lines 21 to logic circuit 114'. The sync code is stored in the computer memory in a software program subroutine and is outputted when a digital code message is selected for transmission.

Compiler 103' comprises buffer register and steering logic 132' and shift registers 134*a'* and 134*b'*. The digital information for transmission by dispatcher equipment is a 32-bit word such as that illustrated in FIG. 14. This dispatcher transmission message comprises the six-bit sync words 143 and 146, the five-bit ID word 144 identifying the addressed mobile unit and the 15-bit code or message word 145. The code names listed in Table 2 are represented by a 1 in the position of the word 145 that is specified by the numeral in the left column of this table. By way of example, the message word 145, 0 . . . 01000, in FIG. 14 specifies the code 10-04. A typical computer 9 may comprise 16-bit registers. Thus, in order to produce the 32-bit message in FIG. 14, at least two 16-bit words must be outputted from the computer. If the registers 134' each have a capacity for storing a 16-bit word, two of these registers are required to receive the transmission message in FIG. 14.

Logic circuit 114' is responsive to the output of the computer on lines 21 for producing the control pulse on line 109' which energizes the power tube in transceiver 7. Lines 186 and 187 are connected to transmitter and receiver circuitry, respectively, in transceiver 7 for coupling signals to logic circuit 114' indicating whether a signal is currently being transmitted or received by the transceiver. After a prescribed time delay for the power tube to warm up, the logic circuit is responsive to the signals on lines 186 and 187 for producing a pulse on line 131' that enables buffer register 132' for loading the contents thereof into shift registers 134*a'* and 134*b'* when the transceiver is inoperative. Shift registers 134' and encoder 105' are responsive to the clock pulses on lines 130' and 140', respectively, for advancing and chopping the contents of the register as was described in relation to the mobile unit in FIG. 9.

Figure 18:
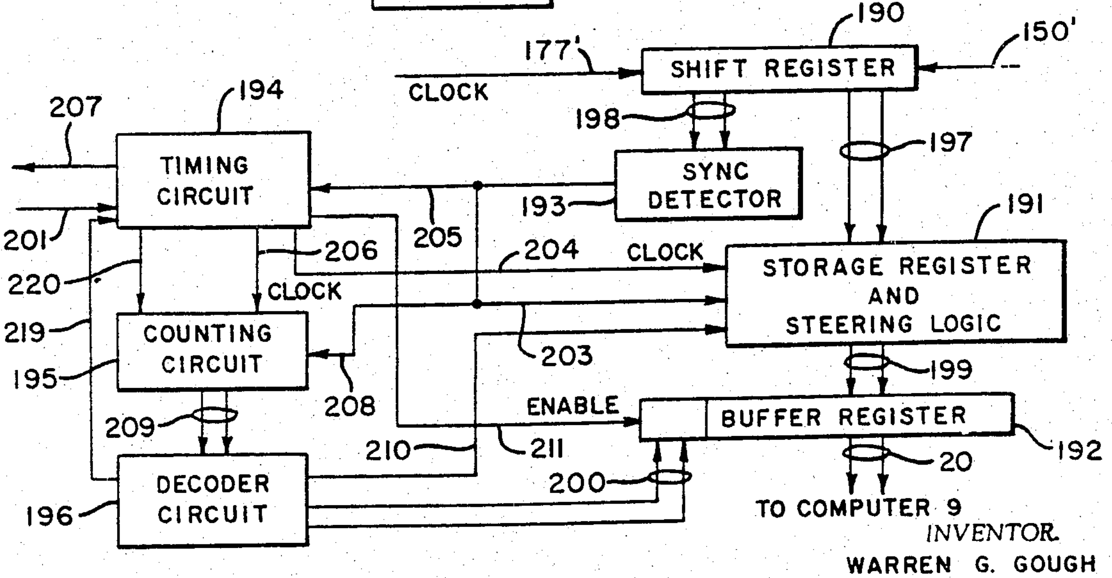
FIG. 18 is a block diagram of the digital converter 104' in FIG. 17.

Digital code messages from a mobile unit are received by antenna 6, coupled through transceiver 7, decoded by circuit 106' and applied on line 150' to converter 104' and sync circuit 152'. The format of the 40-bit message transmitted by the mobile unit and outputted by circuit 106' is illustrated in FIG. 12. Referring now to FIG. 18, converter 104' comprises registers 190, 191 and 192, sync detector circuit 193, timing circuit 194, counter circuit 195, and decoder circuit 196. Shift register 190 is responsive to the low frequency clock pulses on line 177' for advancing the output of decoder 106' therethrough. Register 191 and detector 193 are responsive to the outputs of the shift register on lines 197 and 198, respectively. Register 192 is responsive to the outputs of the storage register 191 on lines 199. Buffer register 192 is also responsive to the outputs of the decoder circuit 196 on lines 200. Timing circuit 194 is responsive to clock pulses on lines 201 from the computer.

Figure 19:
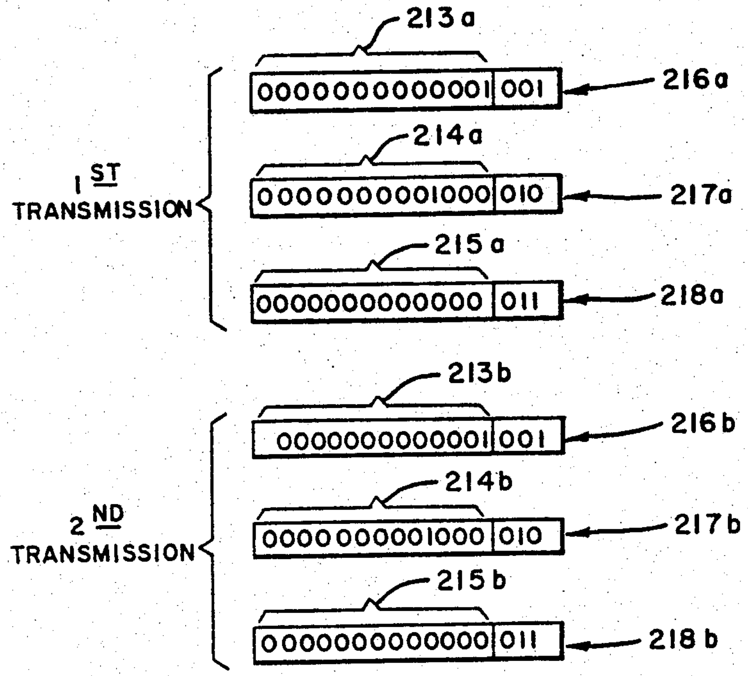
FIG. 19 is a graphic representation of digital words produced by converter 104' in FIG. 18.

When the received digital message (see FIG. 12) is entered into and fills shift register 190, circuit 193 detects the sync word 137 on lines 198 for producing a control pulse on line 203 that enables register 191 to receive the other outputs of the shift register on lines 197. Register 191 is responsive to computer generated low frequency clock pulses that are coupled through circuit 194 on line 204 for advancing the contents thereof out of this register. Timing circuit 194 is also responsive to this control pulse on line 205 for passing computer generated high frequency clock pulses on line 206 and producing a signal on line 207 that causes the operation of the computer to be interrupted to enable it to receive the contents of storage register 191. Counter 195 is enabled by the output of the detector on line 208 for counting the clock pulses on line 206. When the contents of the counter on lines 209 is the binary number 001, decoder circuit 196 produces an output on lines 200 that enters this number in selected stages of buffer register 192 and produces on line 210 a control signal that enables the 13 bits 213 of information (see FIG. 12) in selected stages of register 191 to be entered on lines 199 into other stages of the buffer register 192. The buffer register is enabled by a control pulse from the timing circuit on line 211 for entering the contents thereof (which is represented by the digital word 216a in FIG. 19) on lines 20 into the computer memory.

When the contents of counter circuit 195 on lines 209 is the binary number 010, decoder circuit 196 enters this word on lines 200 into the selected stages of the buffer register and produces the control signal on line 210. Storage register 191 is responsive to this control signal for entering into the other stages of the buffer register 192 the new 13 bits of information 214 (see FIG. 12) advanced into the selected stages of register 191 by the clock pulses on line 204. The buffer register is again enabled by a control pulse on line 211 for entering the contents thereof (the second digital word 217a in FIG. 19) into the computer memory. Similarly, when the contents of the counter circuit is the binary number 011, decoder circuit 196 produces a control pulse on line 219, enters the binary number 011 in the selected stages of the buffer register, and enables the steering logic 191 for entering the remaining eight bits 215 of information (see FIG. 12) in the selected stages of the storage register into the other stages of the buffer register 192. Timing circuit 194 is responsive to the control pulse on line 219 for blocking the clock pulses on line 206 from the counter 195 and producing a control signal on line 220 that resets the counter to the binary word 000. The buffer register is again responsive to a control pulse on line 211 for entering the contents thereof (the third digital word 218a in FIG. 19) into the computer memory.

As stated previously, a mobile unit transmits a code message twice. When the second transmission of the code message fills the shift register 190, circuit 193 again detects the sync pulse 137 on lines 198 for enabling register 191 to store the contents of the other stages of the shift register; for causing the timing circuit to pass clock pulses on lines 204 and 206; for interrupting the operation of the computer so that the information in register 191 may be entered into the computer memory; and for enabling counter 195 to count the clock pulses on line 206. The operation of converter 104' for entering the three words 216b, 217b and 218b on lines 20 into the computer memory is the same as that described above for the binary words 216a, 217a and 218a, respectively.

Software programing in the computer memory causes the computer to compare the respective binary words 216, 217 and 218. If these words are identical, it is determined that a code message is received from a particular mobile unit and the code message portions 213a, 214a and 215a of the words 216a, 217a and 218a are combined to reproduce the parts 138 and 139 of the received message which is processed further by the computer.

The operation of the system will now be described. This system may be operated with mobile units in either all or only some of the patrol cars that are on duty and under the control of a dispatcher. When a new shift gets on duty the dispatcher is given a printed listing of the identity of assigned patrol cars and associated mobile units 3. These cars are listed in alphabetical order according to districts (e.g., B, C, D, etc.) and numerical order within their district (e.g., 1, 2, 3, etc.). The identity of each patrol car and the associated mobile unit is entered into the memory of computer 9 by selectively actuating keys of the dispatcher keyboard 31 in FIG. 3. This also causes the names (e.g. B 3) of the patrol cars to be entered in column 39 of CRT 33 (see FIG. 4).

Consider that the patrol car B 1 having a mobile unit designated W 1 is assigned to patrol duty. This information is selected for entry into computer memory by sequentially actuating the input key X twice, the CAR CHANGE key, the patrol car designator keys B and 1, and the mobile unit designator keys W and 1 (see FIG. 3). This causes the legend X X = B 1 W 5 to appear in the scratch area 47 of display 33 (see FIG. 4). If the dispatcher is satisfied with the correctness of this information, he actuates transmit (XMIT) key 60 to enter it into computer memory. Programing in the computer causes an output on lines 24 which is applied to logic circuit 25 to display the legend B 1 in the first row of column 39 of CRT 33. In a similar manner, the identities of other patrol cars and associated mobile units are entered into computer memory and displayed.

The identity of a patrol car having an inoperative or no mobile unit is entered into the computer memory and displayed in a similar manner except that the identity of the particular mobile unit is designated by actuating the keys W and X. This causes the legend X X = D 6 W X, for example, to appear in the scratch area 47. Actuation of transmit key 60 causes this patrol car to be represented in the last row of column 39 by the legend D* 6. The asterisk (*) in this legend designates that this car does not have an operable mobile unit.

If a patrol car (e.g., car D 1) presently listed in column 39 is reported out of operation as a result of mechanical failure or an officer going off duty, the associated presentation on CRT 33 may be removed by actuating the patrol car designator keys D and 1, the CAR DOWN key, and transmit key 60. The row on display 33 previously assigned to this car will thereafter remain blank. If a particular mobile unit in patrol car D 5, for example, malfunctions or becomes inoperative, this fact can be communicated to the dispatcher by voice. This information is then presented on CRT 33 by actuating the designator keys D and 5, the CAR CHANGE key, the keys W and X and XMIT key 60. This causes the legend D* 5 to appear in the appropriate row of column 39.

When an officer goes on duty with a patrol car B 1, for example, having a mobile unit, he transmits a code 10-08 (inservice) message to let the dispatcher know that he is available for assignment. This digital code message is selected by turning switches 84 and 85 (see FIG. 7) to the code and 10-08 positions, respectively. The officer can tell when switch 85 is in the correct position by watching the visual presentation of the selected code on the screen 71 of the dashboard display unit 67 (see FIG. 6). When no voice signals are heard on the radio, this message is transmitted by pressing switch 96 (see FIG. 7).

The transmitted message is received by antenna 6 and coupled to the computer which automatically addresses and transmits to the car B 1 a code 10-04 (message received) message. The computer also causes the legend 1008 and the time of receipt of the status message to be displayed in the appropriate row of columns 40 and 41, respectively. The transmitted code 10-04 message is received by the addressed patrol car — mobile unit and a visual representation thereof is automatically displayed on the screen 72 of the dashboard display (see FIG. 6). This code message remains in the mobile unit, prevents it from receiving subsequent code messages and maintains the visual representation on screen 47 until the officer in the patrol car presses reset switch 98 (see FIG. 7) to clear the mobile unit.

This operation of the mobile unit in car B 1 and dispatch equipment in transmitting and receiving the code 10-08 message will not be described in more detail. Referring now to FIG. 9, outputs of preset data circuit 113 on lines 123 correspond to synchronization code word 137 and the ID code word 138 for the mobile unit in car B 1 (see FIG. 12). An output of message control circuit 112 (i.e., switch 84) on lines 122 corresponds to the first binary 0 in message word 139 indicating that a digital code message rather than a license check is to be transmitted by the mobile unit. An output of message select circuit 111 corresponding to all but the first two 0's in word 139 indicates that the code 10-08 message selected by switch 85 is to be transmitted. Logic circuit 114 is responsive to these signals on lines 121–123 for displaying on screen 71 (see FIG. 6) the visual representation 10-08 of the code message selected for transmission and entering the digital message for transmission (see FIG. 12) into buffer register 132 (see FIG. 11). Clock pulses are blocked from compiler 103 and encoder 105 by logic circuit 114.

When the officer in car B 1 is satisfied that the message displayed on screen 71 is the one to be transmitted he presses switch 96 (see FIG. 7). This causes an output of control circuit 112 to bias the logic circuit 114 to produce the control signal on line 109 that energizes the power tube in the transceiver for a time interval that is long enough for the tube to warm up to full power and to transmit the selected code message twice. After a time delay for the tube to warm up, logic circuit 114 produces a pulse on line 131 that enables the buffer register 132 to enter the digital message in FIG. 12 into shift register 134 (see FIG. 11). The logic circuit then also passes on line 130 the 250 Hz low frequency clock pulses and produces on line 140 the 2.5 KHz high frequency clock pulses. The contents of shift register 134 is advanced into the encoder by the clock pulses on line 130. When the signal on line 135 has a high logic level it is chopped in gate 141 (see FIG. 13) by the clock pulses on line 140 to produce a 2.5 KHz audio signal. This signal on line 108 frequency modulates the output of the transmitter tube in transceiver 107. When the signal on line 135 is a low logic level, the output of the encoder is a constant voltage. Thus, the output of the transceiver is a signal modulated at the pulse repetition frequency (PRF) of the high frequency clock pulses on line 140 when the output of register 134 is a high logic level and is an unmodulated signal when the output of the shift register is a low logic level. The output of shift register 134 is recirculated on line 136 in order to repeatedly transmit the digital message. Logic circuit 114 includes a counter circuit (not shown) for counting the clock pulses on line 126 and blocking the clock pulses on lines 130 and 140 after the digital message is transmitted twice, i.e., after the message is recirculated once completely through the shift register 134.

The signal transmitted by the mobile unit B 1 is received by antenna 6 and demodulated by transceiver 7 in the dispatch equipment to reproduce the 2.5 KHz audio signal on line 142' (see FIG. 17). Circuit 106' decodes this audio signal to reproduce the digital message shown in FIG. 12 which was originally outputted by shift register 134. Since the mobile units and dispatch equipment are asynchronous, clock circuitry in the dispatch equipment must be synchronized with the received digital message on line 150' before this message is processed further. This is accomplished by sync circuit 152' which resets selected stages *129c'* and *129d'* (not shown) of counter 128' on the positive going edge of each high logic level in the digital message as described above in relation to the sync circuit 152 of the mobile unit in FIG. 10. Digital converter 104' is responsive to the digital message on line 150' and clock pulses as described above in relation to FIGS. 17–19 for entering the first transmission words *216a–218a* and second transmission words *216b–218b* into the computer memory for comparison. If the two words in each digital word pair *216a* and *b*, *217a* and *b* and *218a* and *b* are the same, the computer determines that the signal on line 150' is in fact a digital message from a mobile unit. Programing in the computer memory then causes the computer to produce outputs on lines 24 (see FIG. 1) which causes the legend 1008 and the time of receipt of this status message to be displayed in row 2 of columns 40 and 41, respectively, of CRT 33 (see FIG. 4). Programing in the computer memory also causes the computer to produce outputs on lines 21 that bias logic circuit 114' (FIG. 17) to enter a code 10-04 message, together with the sync code and the ID of the mobile unit that generated the recently received digital message, into buffer register 132'. This digital message (see FIG. 14) is transmitted to the addressed mobile unit by the dispatch equipment as described above in relation to the circuitry in FIG. 17.

The code 10-04 message transmitted by the dispatch equipment is received, decoded, and entered into the shift register 161 (see FIG. 16) of each mobile unit as described above. Only the mobile unit B 1, however, has an ID gate 168 that is enabled by the ID code word 144 in the dispatcher transmitted message in FIG. 14. The output of this gate in only mobile unit B 1 therefore closes gate 170 to open gate 173 to block clock pulses from the shift register 161 and prevent the contents thereof being dumped. Buffer register 162 is also responsive to the operation of gate 170 for receiving the contents of the shift register and presenting the legend 10-04 on the screen 72 (FIG. 6) of the dashboard display only in car B 1. The officer in patrol car B 1 clears screen 72 and converter 104 for receipt of other dispatcher input messages by actuating the reset switch 98 (see FIGS. 7 and 16) to enable gate 173. If the legend 10-04 does not appear on the screen 72 of the dashboard display in car B 1 within approximately 30 seconds after transmission of the code message to dispatcher equipment, the message probably was not received. The officer in car B 1 should then actuate switch 96 to retransmit the message.

Consider that the officer in patrol car B 2 is assigned to interrogate and process a traffic violator. While performing this duty, the legend 1009 (designating the code 10-09, assigned, message) is displayed in the second row of car status column 40 of the dispatcher's CRT 33 (see FIG. 4). When the officer completes this assignment and returns to patrol duty, he rotates switches 84 and 85 to the code and 10-08 positions, respectively, and actuates transmit switch 96 (FIG. 7) to notify the dispatcher of his current status. When the officer sees a 10-04 on screen 72 of of his dashboard display 67 (FIG. 6), indicating that the dispatcher has received the code message, he actuates switch 98 to reset the mobile unit.

Programing in computer 9 causes (1) the original legend 1009 in column 40 to be replaced with the current status message legend 1008 and (2) the alphabetic character C to appear in column 48 in the row for car B 2 (see FIG. 4). The letter C notifies the dispatcher that there has been a change in the status of the associated patrol car B 2. After the dispatcher has mentally noted this status change, the letter C is removed from column 48 by actuating the patrol car designator keys B and 2, the C-M CLEAR key, and XMIT key 60.

If a patrol car B 4 stops to investigate a car parked on the side of a freeway, for example, the officer rotates switches 84 and 85 to the code and 10-09 positions, respectively, and presses switch 96 to transmit a status code 10-09 (assigned) message that is automatically displayed in row 4 of column 40 on CRT 33. The officer then adjusts switch 85 to the 10-11 position and again pushes button 96 to transmit the code 10-11 (desire voice transmission) message. The legend 1011 and letter P, however, are displayed in row 4 of columns 42 and 48, respectively.

The letter P advises the dispatcher that voice transmission is desired by the associated mobile unit B 4. When addressed by voice by the dispatcher, the officer in car B 4 gives his location by voice transmission prior to leaving his patrol car. The dispatcher then clears the mobile message in column 42, row 4, by pressing keys B, 4, MOBILE CLEAR, and XMIT key 60.

The letter P is cleared from column 48, row 4, in a similar manner by pressing keys B, 4, P-T CLEAR, and XMIT key 60.

If the officer does not report back to the dispatcher within a reasonable time interval such as 10 minutes, the dispatcher may request the officer to advise him of his current status by transmitting a code 10-13 message. This is accomplished by the dispatcher pressing keys B, 4, 10-13, and XMIT key 60. This also causes the legend 1013 and the time this message was transmitted to be presented in row 4 of columns 44 and 45, respectively.

Receipt of the code message by the mobile unit in car B 4 causes the white light 81 to be illuminated and a 10-13 to be presented on screen 72 of the dashboard display (FIG. 6). The white light 81 is to attract the officer's attention to the fact that a message has been received by the mobile unit and that action is required by him. If the officer does not acknowledge receipt of this message by actuating switch 97 (FIG. 7) within 5 minutes, programing in the computer causes the letter T to appear in column 48, row 4. The letter T alerts the dispatcher to the fact that the officer may have encountered problems. If the officer still does not acknowledge receipt of the code message and the dispatcher cannot reach him by voice communications within a reasonable time interval, the dispatcher may assign another patrol car to investigate the situation. This letter T will automatically be removed from the dispatcher's display, together with any legends displayed in row 4 of columns 42–45 by receipt of a code 10-04 message from car B 4. Alternatively, the dispatcher may remove the letter T by actuating the keys B, 4, P-T CLEAR and XMIT key 60. Row 4 of columns 44 and 45 may be manually cleared in a similar manner by the dispatcher actuating keys B, 4, DISP (dispatcher) CLEAR, and XMIT key 60.

In many instances, the first notification the police have of a traffic accident is made by a citizen on telephone 35 (FIG. 2). In such a situation, the dispatcher may use voice communications to assign a patrol car C 1 to investigate the situation. While traveling to the accident scene, the patrol officer transmits a code 10-09 (assigned) message which is automatically displayed in column 40, row 6, of CRT 33 (FIG. 4). After checking the accident the officer may request that an ambulance be sent to the scene by transmitting a code 408 (send ambulance) message. If the officer has determined that a tow truck is also needed, he may immediately send a code 409 (send tow) message. Although the computer will not accept the second code message until the first one has been processed and removed from column 42, the letter M (meaning multiple message inputs) is displayed in column 48, row 6. This letter M advises the dispatcher that the officer in car 1 is trying to input a second code message before receiving an answer to his first message. In order to receive the second code message, the dispatcher records the ID of patrol car C 1, the current code 408 (send ambulance) message, and the time of receipt thereof on a tablet for later processing and clears row 6 of columns 42 and 43 by actuating keys C, 1, MOBILE CLEAR, and XMIT key 60. Subsequent transmission of the code 409 (send tow) message by car C 1 will cause the legend 409 to be displayed in column 42, row 6. The officer may then continue his investigation of the accident. After an ambulance and tow truck have been sent to the scene of the accident, the dispatcher transmits a code 410 (requested assistance responding) message to car C 1 by actuating keys C, 1, 410, and XMIT key 60. Row 6 of columns 42–45 (FIG. 4) and screen 72 (FIG. 6) are cleared by the officer in car C 1 pressing switches 97 and 98, respectively (FIG. 7).

Figure 20:
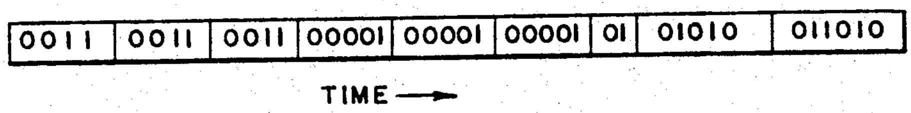
FIG. 20 is a graphic representation of a second digital message (license plate number check) transmitted by a mobile unit 3.

One of the more common tasks performed by an officer in a patrol car is issuing citations to drivers of motor vehicles for violating traffic regulations such as speeding. While an officer (e.g., in car C 5) is directing a motor vehicle to the side of the road for interrogation of the driver, the officer will perform a status check on the license plate number (e.g., AAA 333) of the vehicle in question. In the preferred embodiment of this invention, this is accomplished by rotating switch 84 to the license position and adjusting switches 86–88 to the A position and switches 89–91 to the 3 position (FIG. 7) to display the correct license plate number on the indicator tubes 73–78 of his remote dashboard display unit (FIG. 6). The selected digital message shown in FIG. 20 is transmitted by actuating switch 96. The digital license check message is received by antenna 6 and coupled to computer 9 which actuates the teletype unit 10 to interrogate the central files 11 (FIG. 1) regarding the status of the motor vehicle having the selected license plate number AAA 333. The computer is also responsive to the received signal for presenting the alphabetic character L in column 48, row 10, of the dispatcher's display 33 to apprise the dispatcher that a license check is being made by car C 5. A message indicating the status of the motor vehicle associated with the selected license plate number is automatically retransmitted to the mobile unit in the patrol car C 5 performing the license check.

A code 10-32 message displayed on screen 72 (FIG. 6) indicates that the investigated vehicle is clear, i.e., neither the vehicle nor its registered owner has a previous record and neither is wanted for being a stolen vehicle or having an outstanding warrant. When such a message is received, the officer acknowledges receipt thereof, transmits a code 10-11 message, and then notifies the dispatcher of his location by voice communication. The officer will then approach the stopped vehicle. If the officer is unexpectedly shot by a suspect in the car or some other emergency situation arises and the officer is able to get back to his patrol vehicle, he can immediately signal for help by transmitting a code 406 message. This is accomplished by flipping toggle switch 95 to the ON position (illuminating the red light 82 (FIG. 6) on the dashboard display to notify the officer that the emergency message is selected for transmission) and actuating transmit switch 96 (FIG. 7). Programing in the computer causes this message to override any other message within the computer, displays it in column 42, row 10, even though a legend was already present there and cause the presentation in row 10 to blink slowly on and off. Receipt of this message will also energize blinking light 50 and buzzer 53 (FIG. 2) to call the dispatcher's attention to this emergency situation. The dispatcher may shut buzzer 53 off by actuating the ALERT OFF key 52 on the keyboard (FIG. 3). The dispatcher will then communicate with the officer in car C 5 and may assign other patrol cars to assist him. The flashing of row 10 and light 50 may be inhibited by actuating DEFLASH key (FIG. 3). The letter L in column 48, row 10, is automatically extinguished when the officer acknowledges receipt of the requested license check.

A code 10-31 message, indicating that neither the apprehended motor vehicle nor its registered owner has a previous record, may also be displayed on screen 72 (FIG. 6) in response to a license check. If the officer in car C 5 considers this to be a potentially dangerous situation he may transmit a code 10-96 (timed leave) status message to the dispatcher and notify him of his location before approaching the apprehended vehicle. Receipt of this message causes the legend 1096 to be displayed in column 40 (such as in row 9 thereof). If the officer in car C 5 does not transmit a code message that changes his status in the dispatch equipment within a predetermined time interval such as 5 minutes, programing in the computer causes the blinking light 50 and buzzer 53 to be actuated to indicate that an emergency situation may have arisen. The dispatcher responds to this situation in a manner similar to that for the code 406 message referenced above.

A code 10-30 message response to a license check indicates that the apprehended motor vehicle is stolen or that either the vehicle or its registered owner has warrants outstanding. In response to such a message, the officer may transmit a code 10-25 message requesting that a backup unit be sent prior to approaching the stopped car. In any case, the officer would report his location before approaching the apprehended vehicle. Legends corresponding to the code 10-30, 10-31 and 10-32 message responses to a license check are also displayed in column 44 for car C 5 to apprise the dispatcher of this information. Column 44, row 10, is cleared when the officer in car C 5 transmits a code 10-04 (message received) message.

During each 8 hour working shift it is necessary that officers be allowed a reasonable time off during which they can eat and relax. It is desirable, however, that only a limited number of patrol cars within a prescribed district be out of service for break at any one time. In accordance with this invention, actuation of the MEAL ON key 56 (FIG. 3) by the dispatcher causes programing in the computer to automatically authorize an officer to break for meals in response to a code 10-07M message if no other patrol unit in his district is currently on such a break. If someone in his district is already on a meal break, the requestor will be put in voice communication with the dispatcher who will notify the officer when he may expect to break for lunch. The dispatcher may cause all requests for meals to be cleared through him by actuating the MEAL OFF key 56 which disconnects the aforementioned computer program from the system.

In operation for automatically authorizing meal breaks, consider that the officer in the patrol car B 3 transmits a code 10-07M message requesting that he be allowed to break for meals. Since no one else in the B district is at that time out for lunch the computer causes entry of the legend 1007M in column 40, row 1, and transmits a code 10-04 message which authorizes the officer in car B 3 to take a break. When the officer sees a 10-04 on his screen 72 he resets his mobile unit, transmits a code 10-11 message and notifies the dispatcher of his location by voice before leaving his patrol car. When the officer in car D 3 transmits a code 10-07M message requesting that he be allowed to break for meals, a code 10-23 message is displayed on his screen 72 ordering him to "stand by" for voice communication with the dispatcher since another car (i.e., D 1) within his district is already on a meal break. The computer also causes the legend 1007M to be displayed for car D 3 in column 42, row 13. The dispatcher responds to this request by notifying the officer by voice communications when the latter can expect to be allowed to break for lunch.

When status messages are received by voice communications with a patrol car D* 6 which does not have an operative mobile unit, the status of that car can be manually entered in column 40, row 16. This is accomplished by actuating the car designator keys D and 6, one of the status keys 51, and XMIT key 60. No legends are displayed in columns 42–45 for that car.

Although this invention is described in relation to a police communication system using an FM transceiver, it is also applicable to other applications such as dispatching delivery trucks and may be used with other transceivers that are amplitude modulated, etc.

Figure 21:
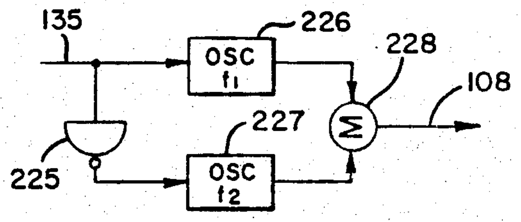
FIG. 21 is a schematic block and circuit diagram of an alternate embodiment of the encoder circuit 105.

Also, although encoder 105 (see FIGS. 9 and 13) is described as producing a signal having an audio frequency when the input signal on line 135 is high and a constant reference voltage (0 Hz) when the input signal is low, the encoder may also produce an output signal having different audio frequencies $f_1$ and $f_2$ when the input signal is high and low, respectively. An encoder 105 for operating in this manner is illustrated in FIG. 21 and comprises a NAND gate 225, audio frequency oscillators 226 and 227, and combining circuit 228. When the input signal is high, oscillator 226 produces an output signal having an audio frequency $f_1$. Conversely, when the input signal is low, the high output signal of gate 225 causes oscillator 227 to produce an output signal having a different audio frequency $f_2$.

Figure 22:
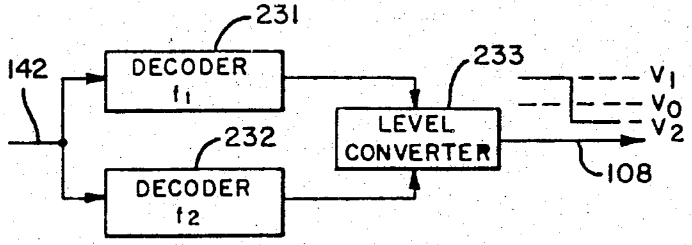
FIG. 22 is a block diagram of an alternate embodiment of the decoder circuit 106.

An associated circuit 106 for decoding such signals to reproduce the digital message is illustrated in FIG. 22. This circuit comprises decoder circuits 231 and 232 that are tuned to receive signals having the frequencies $f_1$ and $f_2$. Circuits 231 and 232 are each similar to the circuit illustrated in FIG. 15. Level converter 233 is responsive to signals from circuits 231 and 232 for reproducing the digital message. The output of converter 233 has a nominal value of $V_o$. When the output of circuits 231 and 232 are high, the output of the converter has the values $V_1$ and $V_2$, respectively.

The foregoing detailed description of the operation of the communications system embodying this invention comprehends a substantial expansion of both the capacity and efficiency of existing police radio channels and equipment while simultaneously enabling both the patrol car policeman and the dispatcher to perform their respective duties more quickly and with a higher degree of safety. The utilization of digital codes for routine though vital messages greatly simplifies the communications portion of the field officer's duties, makes more time available to him to monitor field activities and, in the case of license plate checks, for example, enables him to perform a road interrogation with foreknowledge of facts that could actually save his life. A license check by prior art voice communication techniques requires approximately 15 minutes and requires participation by the dispatcher whereas a similar check using the system of this invention takes about 5 seconds and completely bypasses the dispatcher. The accuracy of transmission of code messages is assured at the field and dispatcher stations by the provision of displays of the message for a ready visual check by the originator immediately before transmission. The features of the digital communication system providing automatic alerts to the dispatcher after predetermined intervals of time in the communications cycle and the retention of messages on the patrol car displays further enlarge the capacity of existing equipment to perform a total communications function. Finally, the inherent capability of this system to enable a single dispatcher to thus communicate with many patrol cars under his control and to utilize their services on the basis of status information which is accurate to the moment provides more efficient utilization of manpower and equipment in solving everyday police problems.

What is claimed is:

1. In a two-way communication system, a radio unit capable of transmitting and receiving both voice and digital electrical signals comprising a transceiver for transmitting and receiving electrical signals, antenna means coupling electrical signals to and from said transceiver, clock means for generating clock pulses having high and low pulse repetition frequencies, control means for selectively producing a digital signal characterized by binary amplitude levels comprising means for generating a digital synchronization word and a unique digital word identifying a particular radio unit, means for generating a digital message word, logic means for combining the digital words from said first and second generating means for assembling the selected digital signal, and message means selectively manually actuated to generate a control pulse for initiating transmission of the assembled digital signal, said logic means being responsive to said control pulse for selectively passing said low frequency clock pulses, means responsive to the output of said logic means for converting said selected digital signal to an analog signal comprising a first digital compiler responsive to the operation of said logic means for simultaneously receiving into prescribed stages thereof said digital identification, synchronization and message words and responsive to said clock pulses passed by said logic means for sequentially advancing the contents of said first compiler for producing a serial digital output signal, and an encoder responsive to the first serial digital signal for generating an electrical signal having one frequency when the amplitude of said serial signal has one binary value and generating another electrical signal having another frequency when the amplitude of said serial digital signal is a second binary value, said transceiver being responsive to said analog signals from said converting means for transmitting same through said antenna means and responsive to such signals from said antenna means for producing received analog signals, means connected to the output of said transceiver for automatically reconverting received analog signals to corresponding binary amplitude level received digital signals, and indicating means responsive to the outputs of said logic means and said reconverting means for providing readable indications of selected and received digital signals, respectively.

2. A radio unit according to claim 1 wherein said reconverting means comprises a decoder responsive to output signals from said transceiver for generating a second serial digital output signal corresponding to a received digital signal, the amplitude of said second serial digital signal having one binary value when the transceiver output signal has one frequency and having a second binary value when the transceiver output signal has another frequency, and a synchronization circuit responsive to the output signal from said decoder and to the high frequency clock pulses from said clock means for synchronizing same.

3. A radio unit according to claim 2 wherein said synchronization circuit includes means for resetting clock means on a transition of the $n^{th}$ serial digital signal where $n$ is an integer greater than 1.

4. A radio unit according to claim 3, said clock means comprising an oscillator producing a train of pulses having a fixed frequency, and counting means having a plurality of stages and being responsive to pulses from said oscillator for producing said low frequency clock pulses having a frequency that is an integral multiple of the fixed frequency, said synchronization circuit being responsive to the $n^{th}$ serial digital signal and pulses in said counting means for resetting selected states thereof on a transition of the $n^{th}$ serial digital signal.

5. A radio unit according to claim 4 wherein the fixed frequency is greater than the frequency of said low frequency clock pulses and said first counting means comprises a plurality of divider circuits connected in series to the output of said first oscillator, said synchronization means being responsive to the output of one of said divider circuits for resetting another divider circuit producing an output signal having a frequency less than the output frequency of said one divider circuit on generation of a predetermined output pulse of said one divider circuit following a transition of the $n^{th}$ serial digital output signal.

6. A radio unit according to claim 2 wherein said reconverting means includes a pulse control circuit responsive to the output of said clock means for selectively passing said low frequency clock pulses, a second digital compiler responsive to said low frequency clock pulses from said control circuit for advancing said second serial digital signal through stages of said second compiler, and a decoding circuit responsive to the contents of predetermined stages of said second compiler for producing a second control pulse only when said predetermined stages thereof contain a particular digital identification code word unique to the radio unit, said control circuit also being responsive to the second control pulse for blocking the low frequency clock pulses for causing said second compiler to hold the contents in the stages thereof.

7. A radio unit according to claim 6 wherein said indicating means is responsive to contents of said second compiler for producing a visual display of received digital signals.

8. A radio unit according to claim 6 wherein said decoding circuit comprises first and second logic elements for producing outputs having prescribed values when the contents of particular different sets of stages of said second compiler contain a specified digital synchronization code word, a third logic element producing an output having a prescribed value when a particular set of stages of said second compiler contains a unique digital identification code associated only with this unit, and a fourth logic element responsive to the outputs of said first, second and third logic elements having the prescribed values for producing the second control pulse.

9. A radio unit according to claim 8 wherein said pulse control circuit comprises a fifth logic element having a first input receiving said low frequency clock pulses and having a second input responsive to the second control pulse from said decoder circuit.

10. A radio unit according to claim 2 including means for recirculating said first serial digital signal through said first compiler, said logic means being responsive to the low frequency clock pulses for blocking these pulses from said first compiler when the first serial digital signal has circulated a predetermined number of times therethrough.

11. A radio unit according to claim 2 wherein said logic means is responsive to said low frequency clock pulses for producing high frequency clock pulses having a frequency greater than and being a multiple of the frequency of the low frequency clock pulses, said encoder being responsive to said high frequency clock pulses for chopping at the frequency thereof the first serial digital signal having one binary value.

12. A radio unit according to claim 2 wherein said converting means comprises a second oscillator responsive to the first serial digital signal having an amplitude of one binary value for producing an electrical signal having one audio frequency, and a third oscillator responsive to the first serial digital signal having an amplitude of the other binary value for producing an electrical signal having a different audio frequency.

13. A radio unit according to claim 2 wherein said message word generating means comprises switch means for selectively specifying transmission of digital code message words and digital status check message words, first means for selecting one of several predetermined digital code message words, and second means for selecting a digital word representing a motor vehicle license plate number.

14. A radio unit according to claim 13 wherein said first selecting means comprises a first switch having a plurality of positions each corresponding to a different predetermined digital code.

15. A radio unit according to claim 14 wherein said second selecting means comprises a plurality of second switches, some of said second switches having positions designating alphabetic characters and other of said second switches having positions designating numeric characters.

16. A radio unit according to claim 15 wherein said indicating means comprises a plurality of tubes for displaying characters selected by said second switches.

17. A radio unit according to claim 16, comprising a third switch having a first position for electrically interchanging the selected characters that are displayed on particular tubes, and having a second position, said indicating means comprising a first light that is illuminated when said third switch is in the first position.

18. A radio unit according to claim 6 wherein said indicating means includes a second light electrically connected to said second compiler and adapted to be illuminated when a received digital communication is held in said compiler.

19. A radio unit according to claim 6 wherein said control means comprises third means for selecting for transmission a digital code word acknowledging receipt of a digital signal.

20. A radio unit according to claim 19 wherein said reconverting means includes reset switch means for causing the pulse control circuit to pass the low frequency clock pulses to said second compiler for advancing the contents thereof to enable it to receive a subsequently received digital signal.

21. A radio unit according to claim 2 wherein said decoder comprises a filter circuit connected to the output of said transceiver and passing only signals from said transceiver having the one frequency, a first detector connected to the output of said filter circuit and producing a signal having an amplitude proportional to the energy in signals passed by said filter circuit, and a second detector connected to the output of said first detector and producing a signal having a constant amplitude only when the amplitude of the signal from said first detector is greater than a prescribed threshold level.

22. A radio unit according to claim 12 wherein said decoder comprises a third frequency selective detector circuit producing an output signal having a first constant amplitude only when the frequency of signals passed by said transceiver is the one frequency, a fourth frequency selective detector circuit producing an output signal having a second constant amplitude only when the frequency of signals passed by said transceiver is the other frequency, and means for combining the output signals of said third and fourth detector circuits for producing the second serial digital signal.

23. A radio unit according to claim 2 wherein said first digital compiler comprises a first shift register having a plurality of stages including first and last stages, and a first buffer register responsive to the first control pulse for entering the assembled digital message into stages thereof, said first shift register being responsive to the low frequency clock pulses passed by said logic means for serially advancing the contents from said last stage for producing the first serial digital signal, and means for coupling the first serial digital signal from the output of said last stage to the input of said first stage for recirculating the contents of said plurality of stages.

24. A radio unit according to claim 2 wherein said reconverting means includes a digital converter responsive to the output of said decoder for detecting when a received digital signal is in said decoder output.

25. A radio unit according to claim 24 wherein said digital converter comprises means for dividing the second serial digital signal into a prescribed number of parts each having a predetermined length, and means for comparing corresponding parts of two successively received second serial digital signals for confirming that a received digital message is present.

26. A radio unit according to claim 25 wherein said second dividing means comprises a second shift register responsive to low frequency clock pulses for advancing signals from said decoder therethrough, means for detecting when a second serial digital signal is in said second shift register, and means for outputting from said second shift register said parts of second serial digital signals.

27. A radio unit according to claim 26 wherein said outputting means comprises storing means responsive to the operation of said detecting means for receiving the contents of selected stages of said second shift register, said comparing means receiving the contents of said storing means.

28. A radio unit according to claim 27 wherein said detecting means includes timing means producing a train of clock pulses and periodically producing third control pulses, said storing means comprising a third shift register responsive to said clock pulses for advancing the contents thereof.

* * * * *